United States Patent
Bunkheila et al.

(10) Patent No.: US 10,726,368 B2
(45) Date of Patent: Jul. 28, 2020

(54) INNOVATIVE SATELLITE SCHEDULING METHOD BASED ON GENETIC ALGORITHMS AND SIMULATED ANNEALING AND RELATED MISSION PLANNER

(71) Applicant: TELESPAZIO S.p.A., Rome (IT)

(72) Inventors: Federico Bunkheila, Rome (IT); Christian Circi, Rome (IT)

(73) Assignee: TELESPAZIO S.P.A., Rome (IT)

( * ) Notice: Subject to any disclaimer, the term of this patent is extended or adjusted under 35 U.S.C. 154(b) by 69 days.

(21) Appl. No.: 15/987,818

(22) Filed: May 23, 2018

(65) Prior Publication Data

US 2018/0341894 A1    Nov. 29, 2018

(30) Foreign Application Priority Data

May 24, 2017    (IT) .................. 102017000056428

(51) Int. Cl.
*G06Q 10/06*    (2012.01)
*B64G 1/10*    (2006.01)
(Continued)

(52) U.S. Cl.
CPC ..... *G06Q 10/06312* (2013.01); *B64G 1/1021* (2013.01); *B64G 3/00* (2013.01);
(Continued)

(58) Field of Classification Search
CPC ........... G06Q 10/06312; G06Q 10/063; G06N 3/126; G03N 5/003; B64G 1/1021; B64G 3/00
(Continued)

(56) References Cited

U.S. PATENT DOCUMENTS 5,850,617 A * 12/1998 Libby .................. B64G 1/24
                                                      701/25
6,405,186 B1 * 6/2002 Fabre .................. B64G 1/1021
                                                      706/45

(Continued)

OTHER PUBLICATIONS

Globus, A. et al. Scheduling Earth Observing Satellites with Evolutionary Algorithms. National Technical Information Service. (2003).*

(Continued)

*Primary Examiner* — Timothy Padot
(74) *Attorney, Agent, or Firm* — Seed Intellectual Property Law Group LLP

(57) ABSTRACT

A method includes: a) producing initial scheduling plans based on requests related to tasks to be performed within a time period by a remote sensing satellite; wherein each initial scheduling plan schedules respective tasks, which do not conflict with each other in time and in using satellite resources; and each task is scheduled in at least one of the initial scheduling plans; b) applying a genetic-algorithm-based processing to the initial scheduling plans to produce a genetic-algorithm-based scheduling plan which is for mission objectives, and complies with constraints related to the satellite resources, to the tasks, and to the time period; and c) applying a simulated-annealing-based processing to the genetic-algorithm-based scheduling plan to produce a simulated-annealing-based scheduling plan that fits the mission objectives, complies with the constraints, and in which a larger number of tasks is scheduled than in the genetic-algorithm-based scheduling plan.

5 Claims, 12 Drawing Sheets

(51) Int. Cl.
G06N 3/12 (2006.01)
G06N 5/00 (2006.01)
B64G 3/00 (2006.01)
(52) U.S. Cl.
CPC ............. *G06N 3/126* (2013.01); *G06N 5/003* (2013.01); *G06Q 10/063* (2013.01)
(58) Field of Classification Search
USPC ....................................................... 705/7.22
See application file for complete search history.

(56) References Cited

U.S. PATENT DOCUMENTS

| | | | |
|---|---|---|---|
| 9,651,946 B1 | 5/2017 | Rubel et al. | |
| 2008/0040190 A1* | 2/2008 | Khosla | G06F 9/4881 705/7.22 |
| 2008/0244584 A1* | 10/2008 | Smith | G06F 9/4881 718/102 |

OTHER PUBLICATIONS

Bremermann, "A Method of Unconstrained Global Optimization," *Mathematical Biosciences* 9:1-15, 1970 (18 pages).
Brucker, *Scheduling Algorithms*, Fifth Edition, Springer-Verlag, Berlin, Germany, 2007, 378 pages.
de Jong et al., "DECA: Dimension Extracting Coevolutionary Algorithm," *Proceedings of the 8th Annual Conference on Genetic and Evolutionary Computation*, Seattle, Washington, Jul. 8-12, 2006, pp. 313-320.
Frehland (Ed), *Synergetics—From Microscopic to Macroscopic Order*, Springer-Verlag, Berlin, Germany, 1984, Rechenberg, "The Evolutions Strategy. A Mathematical Model of Darwinian Evolution," pp. 122-132 (15 pages).
Friedberg et al., "A Learning Machine: Part II," *IBM Journal of Research and Development* 3(3):282-287, Jul. 1959.
Globus et al., "A Comparison of Techniques for Scheduling Earth Observing Satellites," *Proceedings of the 16th conference on Innovative Applications of Artificial Intelligence*, Jul. 25-29, 2004, San Jose, California, pp. 836-843.
Goldberg, *The Design of Innovation | Lessons from and for Competent Genetic Algorithms*, Springer-Science + Business Media, B.V., Berlin, Germany, 2002, Chapter 2, "Making Genetic Algorithms Fly," pp. 11-24 (25 pages).
Goldberg, *The Design of Innovation | Lessons from and for Competent Genetic Algorithms*, Springer-Science + Business Media, B.V., Berlin, Germany, 2002, Chapter 1, "Genetic Algorithms and Innovation," pp. 1-9 (20 pages).
Gonçalves et al., "A Hybrid Genetic Algorithm for the Job Shop Scheduling Problem," *European Journal of Operational Research* 167(1):77-95, 2005.
Hajek, "A Tutorial Survey of Theory and Applications of Simulated Annealing," *Proceedings of the 24th Conference on Decision and Control*, Fort Lauderdale, Florida, Dec. 1985, pp. 755-760.
Holland, "Genetic Algorithms Computer | programs that "evolve" in ways that resemble natural selection can solve complex problems even their creators do not fully understand," *Scientific American* 267(1):66-72, Jul. 1992 (8 pages).

Kirkpatrick et al., "Optimization by Simulated Annealing," *Science* 220(4598):671-680, May 131983 (11 pages).
Kolici et al., "Local Search and Genetic Algorithms for Satellite Scheduling Problems," *Eighth International Conference on Broadband, Wireless Computing, Communication and Applications*, Compiegne, France, Oct. 28-30, 2013, 8 pages.
Li et al., "Scheduling Observations of Agile Satellites with Combined Genetic Algorithm," *Third International Conference on Natural Computation*, Aug. 24-27, 2007, Haikou, China, 5 pages.
Lian et al., "An Effective Hybrid Genetic Simulated Annealing Algorithm for Process Planning Problem," *5th International Conference on Natural Computation*, Tianjin, China, Aug. 14-16, 2009, pp. 367-373.
Liu et al., "Image based Reconstruction using Hybrid Optimization of Simulated Annealing and Genetic Algorithm," *Proceedings of the first ACM/SIGEVO Summit on Genetic and Evolutionary Computation*, Shanghai, China, 2009, pp. 875-878.
Metropolis et al., "Equation of State Calculations by Fast Computing Machines," *The Journal of Chemical Physics* 21(6):1087-1092, Jun. 1953.
Mitchell et al., "Array pattern synthesis in the complex plane optimised by a genetic algorithm," *Electronics Letters* 32(20):1843-1845, Sep. 26, 1996.
Murata et al., "Genetic Algorithms for Flowshop Scheduling Problems," *Computers ind. Engng* 30(4):1061-1071, 1996.
Nolte et al., "A Note on the Finite Time Behavior of Simulated Annealing," *Mathematics of Operations Research* 25(3):476-484, Aug. 2000.
Sadegheih, "Scheduling problem using genetic algorithm, simulated annealing and the effects of parameter values on GA performance," *Applied Mathematical Modelling* 30:147-154, 2006.
Serafini (Ed.), *Mathematics of Multi Objective Optimization*, Springer-Verlag, Berlin, Germany, 1985, Lee et al., "Dominance Concepts in Random Outcomes," pp. 23-43 (23 pages).
Sharma, "Practical handbook of genetic algorithms, vol. I Applications; vol. II New frontiers," A Review, *The Mathematical Gazette* 81(491):346-348, 1997.
Syswerda, "A Study of Reproduction in Generational and Steady-State Genetic Algorithms," *Foundations of Genetic Algorithms* 1:94-101, 1991.
Tamilarasi et al., "An enhanced genetic algorithm with simulated annealing for job-shop scheduling," *International Journal of Engineering, Science and Technology* 2(1): 144-151, 2010.
Thamilselvan et al., "Integrating Genetic Algorithm, Tabu Search Approach for Job Shop Scheduling," *International Journal of Computer Science and Information Security* 2(1): 2009, 6 pages.
van Laarhoven et al., *Simulated Annealing: Theory and Applications*, Springer-Science + Business Media, B.V., Berlin, Germany, 1987, Chapter 2, "Simulated annealing" pp. 7-15 (14 pages).
Wall, "A Genetic Algorithm for Resource-Constrained Scheduling," Doctoral Thesis, Massachusetts Institute of Technology, Cambridge, Massachusetts, Jun. 1996, 62 pages.
Xhafa et al., "Genetic algorithms for satellite scheduling problems," *Mobile Information Systems* 8:351-377, 2012.
Yu et al., "A combined genetic algorithm/simulated annealing algorithm for large scale system energy integration," *Computers and Chemical Engineering* 24:2023-2035, 2000.
Zain et al., "Integration of Simulated annealing and genetic algorithm to estimate optimal solutions for minimising surface roughness in end milling Ti—6AL—4V," *International Journal of Computer Integrated Manufacturing* 24(6):574-592, Jun. 2011.

* cited by examiner

INNOVATIVE SATELLITE SCHEDULING METHOD BASED ON GENETIC ALGORITHMS AND SIMULATED ANNEALING AND RELATED MISSION PLANNER

PRIORITY CLAIM

This application claims priority from Italian Patent Application No. 102017000056428 filed on May 24, 2017, the disclosure of which is incorporated by reference.

TECHNICAL FIELD

The present disclosure relates to Earth Observation (EO) based on satellite remote sensing systems. In particular, the present disclosure provides an optimized solution to the so-called "Satellite Scheduling Problem" (SSP), which derives from the classical "Resource-Constrained Project Scheduling Problem" (RCPSP).

DESCRIPTION OF THE RELATED ART

As is known, satellite remote sensing is mainly based on the use of two types of sensors:
- passive sensors, such as optical and infrared sensors, which generally sense electromagnetic radiation emitted and reflected by the Earth's surface (in particular, reflected solar electromagnetic radiation); and
- active sensors, such as Synthetic Aperture Radars (SARs) and Light Detection and Ranging (LiDARs), which generally illuminate the Earth's surface by emitting a predefined electromagnetic radiation and then sense the back-scattered electromagnetic radiation.

In this connection, it is worth noting that hereinafter, for the sake of description simplicity, the generic terminologies "acquire an image", "acquisition task", and even just "acquisition" (and related synonyms, such as "scan") will be used to denote satellite activities required for the achievement of an image on the Earth's surface (e.g., pointing and acquisition maneuvers for scanning a given area of the Earth's surface) based on the use of an on-board active or passive sensor (such as a SAR or an optical sensor).

Nowadays, the design of ground segments for EO satellites is carried out by looking for an automatization of processes in order to make them more efficient, affordable and performant. In particular, an automatic scheduling of satellite resources for satisfying requested acquisition tasks would allow to fulfill fundamental mission objectives. In this connection, main requirements concern the satisfaction of operational performances along with abidance of operations' chronology. For this reason, the way in which automatization can be satisfactory performed is a stimulating task which is currently deeply investigated in the aerospace sector.

In the past, remote sensing missions based on satellites having a fixed attitude were usually designed to exploit repeating ground tracks characterized by given revisit times (typically, equal to a predefined number of Earth's nodal days). In order to lower this limit, the so-called agile satellites, characterized by high maneuverability and accurate pointing, are currently employed to provide better results for missions that need a fast recovery of images. Indeed, at each orbit pass, agile satellites potentially have the capability of acquiring images over a wider area of the Earth's surface than traditional satellites. On the other hand, advantages are counterbalanced by an increase in the complexity of the management of the acquisition tasks, and by the need to introduce optimization processes to satisfy the mission objectives and to avoid latencies and losses. All these aspects shall be taken into account in the design of modern satellite Mission Planners (MPs) of Ground Segments for new generation satellites.

As is known, the SSP (which, as previously explained, derives from the classical RCPSP) requires an appropriate search for the best solutions in the planning of the necessary tasks for acquisition activities, resulting from the combination of hard combinatorial optimization problems.

With reference to computational complexity theory, the RCPSP is a generalization of some well-known strongly Non-deterministic Polynomial-Hard (NP-Hard) problems. This implies that:
- no efficient (i.e., polynomial) algorithm for optimally solving the RCPSP is likely to exist; and
- general-purpose solvers, that do not exploit the particular combinatorial structure of the RCPSP and do not take into account its complexity within their resolution strategies, cannot deal with large-sized instances.

For a detailed description of the state of the art related to SSP and RCPSP, in the following reference will be made to:
C. S. Sharma, *Review: Practical Handbook of Genetic Algorithms by Lance Chambers*, The Mathematical Gazette, Vol. 81, No. 491, pp. 346-348, July 1997, doi: 10.2307/3619253 (hereinafter referred to as Ref1);
A. Sadegheih, *Scheduling problem using genetic algorithm, Simulated Annealing and the effects of parameter values on GA performance*, Applied Mathematical Modelling, Vol. 30, No. 2, pp. 147-154, February 2006, doi: 10.1016/j.apm.2005.03.017 (hereinafter referred to as Ref2);
M. B. Wall, *A Genetic Algorithm for Resource-Constrained Scheduling*, doctoral thesis for the degree of Doctor of Philosophy in Mechanical Engineering at the Massachusetts Institute of Technology (MIT), 1996 (hereinafter referred to as Ref3);
G. Syswerda, *A Study of Reproduction in Generational and Steady-State Genetic Algorithms*, Foundations of Genetic Algorithms, pp. 94-101, 1991, doi: 10.1016/b978-0-08-050684-5.50009-4 (hereinafter referred to as Ref4);
D. E. Goldberg, *Making Genetic Algorithms Fly*, The Design of Innovation, Vol. 7 of the series Genetic Algorithms and Evolutionary Computation, pp. 11-24, 2002 doi: 10.1007/978-1-4757-3643-4_2 (hereinafter referred to as Ref5);
R. J. Mitchell, B. Chambers, A. P. Anderson, *Array pattern synthesis in the complex plane optimised by a genetic algorithm*, Electronics Letters, Vol. 32, No. 20, pp. 1843-1845, 1996, doi:10.1049/el:19961255 (hereinafter referred to as Ref6);
J. H. Holland, *Genetic Algorithms*, Scientific American, Vo. 267, No. 1, pp. 66-72, 1992, doi:10.1038/scientificamerican0792-66 (hereinafter referred to as Ref7);
E. D. de Jong, A. Bucci, *DECA: Dimension Extracting Coevolutionary Algorithm*, Proceedings of the 8th Annual Conference on Genetic and Evolutionary Computation—GECCO'06, pp. 313-320, Seattle, Wash., USA, Jul. 8-12, 2006, doi: 10.1145/1143997.1144056 (hereinafter referred to as Ref8);
T. Murata, H. Ishibuchi, H. Tanaka, *Genetic algorithms for flow shop scheduling problems*, Computers & Industrial Engineering, Vol. 30, No. 4, pp. 1061-1071, 1996, doi: 10.1016/0360-8352(96)00053-8 (hereinafter referred to as Ref9);
J. F. Gonçalves, J. J. de Magalhães Mendes, M. G. C. Resende, *A hybrid genetic algorithm for the job shop scheduling problem*, European Journal of Operational Research, Vol. 167, No. 1, pp. 77-95, 2005, doi: 10.1016/j.ejor.2004.03.012 (hereinafter referred to as Ref10);

A. Globus, J. Crawford, J. Lohn, A. Pryor, *A comparison of techniques for scheduling earth observing satellites*, Proceedings of the 16th conference on Innovative Applications of Artificial Intelligence—IAAI'04, pp. 836-843, San Jose, Calif., Jul. 25-29, 2004 (hereinafter referred to as Ref11);

H. Yu, H. Fang, P. Yao, Y. Yuan, *A combined genetic algorithm/Simulated Annealing algorithm for large scale system energy integration*, Computers and Chemical Engineering, Vol. 24, No. 8, pp. 2023-2035, 2000, doi: 10.1016/s0098-1354(00)00601-3 (hereinafter referred to as Ref12);

A. M. Zain, H. Haron, S. Sharif, *Integration of Simulated Annealing and genetic algorithm to estimate optimal solutions for minimising surface roughness in end milling Ti-6AL-4V*, International Journal of Computer Integrated Manufacturing, Vol. 24, No. 6, pp. 574-592, 2011, doi: 10.1080/0951192x.2011.566629 (hereinafter referred to as Ref13);

K. Lian, C. Zhang, X. Li, L. Gao, *An Effective Hybrid Genetic Simulated Annealing Algorithm for Process Planning Problem*, Proceedings of the Fifth International Conference on Natural Computation—ICNC'09, Vol. 5, pp. 367-373, Aug. 14-16, 2009, doi: 10.1109/icnc.2009.689 (hereinafter referred to as Ref14);

C. Liu, W. Wan, Y. Wu, *Image based reconstruction using hybrid optimization of simulated annealing and genetic algorithm*, Proceedings of the First ACM/SIGEVO Summit on Genetic and Evolutionary Computation—GEC'09, pp. 875-878, Shanghai, China, Jun. 12-14, 2009, doi: 10.1145/1543834.1543964 (hereinafter referred to as Ref15);

A. Tamilarasi, T. A. Kumar, *An enhanced genetic algorithm with simulated annealing for job-shop scheduling*, International Journal of Engineering, Science and Technology, Vol. 2, No. 1, pp. 144-151, 2010, doi: 10.4314/ijest.v2i1.59105 (hereinafter referred to as Ref16);

R. Thamilselvan, P. Balasubramanie, *Integrating Genetic Algorithm, Tabu Search and Simulated Annealing For Job Shop Scheduling Problem*, International Journal of Computer Applications, Vo. 48, No. 5, pp. 42-54, June 2012, doi: 10.5120/7348-0283 (hereinafter referred to as Ref17); and V. Kolici, X. Herrero, F. Xhafa, L. Barolli, *Local Search and Genetic Algorithms for Satellite Scheduling Problems*, Eighth International Conference on Broadband and Wireless Computing, Communication and Applications (BWCCA), Oct. 28-30, 2013, doi: 10.1109/bwcca.2013.58 (hereinafter referred to as Ref18).

As is known, many decision-making and RCPSP-like problems can be formulated as bi-level programming models (single-objective or multi-objectives), that are intrinsically non-convex and it is thus difficult to find the global optimum. Compared with the previous heuristic algorithms, Evolutionary Algorithms (EAs) are much simpler in principle and more efficient in applications. In fact, many applications involve combining a heuristic algorithm with a multi-objective optimization in order to find a set of optimal solutions (at least one solution). This can be done even simpler by means of EAs than multi-objective hill climbing strategies, because EAs operate on a population of solutions rather than a single solution. A multi-objective approach returns intrinsically, efficiently and simultaneously a number of solutions which can be attributed to the parallelism and globality of EAs (in this connection, reference can be made, for example, to Ref1) and such a characteristic is independent of the kind of approach adopted in the multi-objective cost functions (Pareto optimal or not).

Quite recently, EAs have been applied to try solving scheduling problems, giving discordant outcomes. For example, in Ref2 the use of Genetic Algorithms (GAs) to optimize production schedules provides a general purpose solution to the scheduling problem, wherein the peculiarities of any particular scenario are taken into account in the cost function without disturbing the logic of the standard optimization routine.

However, as stated in Ref3, the GA does not perform well on problems in which the resources are tightly constrained. Indeed, EAs are not sufficiently strong to satisfy the requested optimality performances. This is explained by the fact that a smaller population size tends to concentrate on higher quality solutions relatively quickly in the evolution, and then GA tends to suffer from a mild case of premature convergence (in this connection, reference can be made, for example, to Ref4). Thence, GAs have been considered as not adequate to provide a convergence to a satisfactory solution to SSP, thereby resulting in an improvement being necessary to compensate for this lack and in an enhancement of global scheduling based on different features of probabilistic algorithms being required.

Since GAs may converge slowly, the combination of a GA with other heuristics may improve the results; for example, a GA may be combined with other metaheuristics for a neighborhood search. To this end, Holland's theoretical work on genetic plans (in this connection, reference can be made to Ref7) was seen as an obvious place to look for an explanation for the adaptive capacity of GAs. Holland and his students simplified this work and provided the well-known explanation named Building Block Hypothesis (BBH) (in this connection, reference can be made, for example, to Ref5, Ref6 and Ref7).

Moreover, from Ref8 it emerged a picture of GA as a robust adaptive search procedure which was surprisingly effective as global heuristic search.

BBH is based on two fundamental assumptions:

1. when a GA solves a problem, there exist some low-order, low-defining length schemata with above-average fitness (the so-called Building Blocks);

2. a hypothesis that an improved GA performs adaptation by implicitly and efficiently implementing an internal heuristic method.

The hypothesis states that small pieces of a solution that exhibit above-average performance can be combined and reassembled to create larger pieces of higher-average quality. By the simple GA schemata, solutions are combined step by step in order to form larger and better strings, while by using the heuristic approach according to the BBH, instead of testing any possible binary configuration, the complexity of the problem can be efficiently decreased.

Indeed, GAs may have a tendency to converge towards local optima or even arbitrary points rather than the global optimum of the problem, because nominal genetic techniques do not try to recombine blocks in order to escape from the deadlock. Additionally, GAs do not scale well with complexity and, where the number of elements which are exposed to mutation is large, there is often an exponential increase in the search space size. Thus, a trade-off between mutation of single elements and recombination of blocks would overcome the disadvantages and a heuristic/metaheuristic approach as a support of the global optimization is beneficial.

In Ref9, higher performance of a hybrid approach based on GA, local search and Simulated Annealing (SA) is demonstrated by computer simulations, while in Ref10 after a schedule is obtained through a GA, a local search is applied to improve the solution. This kind of improvements are due to the fact that, while EAs prevalently copy the behavior of natural evolution and treat solution candidates as individuals that compete in a virtual environment, metaheuristics use, instead, the neighbors of a solution as a way to explore the local solutions space. Additionally, although metaheuristics prefer better neighbors, they also accept worse neighbors in order to avoid getting stuck in local optima. As a result, if the algorithm is run for an infinite amount of time, the global optimum will be found.

The metaheuristic SA, for example, decides which candidate solution to be evaluated next according to the Boltzmann probability factor of atom configurations of solidifying metal melts. In particular, SA benefits from a proof of optimality in performance, at least for an infinitely slow cooling schedule and better than Hill climbing techniques, and is less vulnerable to local minima (in this connection, reference can be made to Ref11), whose depth raises together with the increase of the plan complexity. SA has been successfully adapted to give approximate solutions to the SSP, being basically a guided algorithm of random local search which allow moves with negative gain.

A combination of GAs with SA has been already discussed in different fields. For example, in Ref12 an improved GA is combined with a SA algorithm to avoid the common defect of early convergence for solving large scale system energy integration problems. Numerical calculations showed that the new algorithm can converge faster than either SA or GA algorithms alone, and has much more probability of locating a global optimum.

Additionally, Ref13 teaches an integration of SA and GA for manufacturing a specific metal alloy and shows that such an integration reduces the number of iteration in searching for the optimal solution compared to the conventional GA and SA, respectively.

Similarly, a hybrid genetic SA has been developed for minimizing manufacturing costs (in this connection, reference can be made to Ref14), where the GA is carried out as main methodology, while SA is used as a local search strategy to help GA to jump out of local optima.

An additional application of GA and SA is presented in Ref15 for a statistical image reconstruction, where both the algorithms retrieve solutions through a sequence of iterative states. In particular, Ref15 states that, while GA rapidly discovers the search space, but has difficulty in finding the optimal solution, SA is able to find good quality solutions in a neighborhood by escaping from local optima, since SA works on a single solution at a time.

Again with reference to scheduling problems, in Ref16 the use of a hybrid GA along with SA introduces a reasonable combination of local search and global search for solving the job-shop scheduling problem.

Moreover, in Ref17 SA has been advantageously used to speed up a GA to get a solution by applying it for the population members.

Additionally, with respect to the SSP, in Ref18 the use of combined heuristic and metaheuristic methods for solving the SSP provides high quality solutions which meet the expected requirements.

Furthermore, U.S. Pat. No. 5,850,617 A, which relates to a system and method for route planning under multiple constraints, discloses a route planning mechanism that receives a target set denoting a set of available targets, a set of target parameter thresholds for binning target parameters, a set of mission objectives and a corresponding set of mission thresholds for binning the mission parameters. The route planning mechanism, according to U.S. Pat. No. 5,850,617 A, may also receive an avoidance set denoting obstacles to be avoided. The mission objectives define a number of distinct target parameter priority orderings, each associated with a respective mission status. Successive best next targets are selected and added to a selected target sequence list until a mission completion criteria is satisfied. Each best next target is selected by determining a mission status in accordance with the previously selected targets, and a corresponding target parameter priority ordering. The target parameters of each available target are mapped into respective bin values in accordance with their respective target thresholds, and a cost function value is computed for each available target. A subset of the available targets having a best cost function value is selected. That subset is successively narrowed until the subset contains only one target, and then that one target is selected as the best next target. The subset narrowing is performed using the bin values of the target parameters, applied in the target parameter priority ordering that is based on the current mission status. The resulting sequence of selected targets is then passed to a route utilization system, such as a satellite control system.

Moreover, U.S. Pat. No. 6,405,186 B1, which relates to a method of planning satellite requests by constrained Simulated Annealing (SA), discloses an iterative method enabling a request plan to be established for an observation satellite. A plan consists in a succession of requests which are associated with pluralities of opportunities for satisfying said requests. The plan must also comply with a plurality of constraints. Each iteration k of the iterative method according to U.S. Pat. No. 6,405,186 B1 is made up of the following steps: new opportunity is selected; a provisional plan is derived from the preceding plan k−1 as calculated in the preceding iteration k−1, and from the new opportunity; provisional plan is verified for compliance with said plurality of constraints; the quality of said provisional plan is evaluated; and it is determined whether the provisional plan should be confirmed as plan k, as a function of the quality of said provisional plan and of the quality of said preceding plan k−1. In the method according to U.S. Pat. No. 6,405,186 B1 it is decided whether or not to confirm the provisional plan by a probabilistic metaheuristic of the SA type, and by the rule for constructing the provisional plan as a function of the newly selected opportunity.

BRIEF SUMMARY

In the heuristic problems, the search for a robust and consistent set of solutions often occupies a significant part of the algorithms design. The optimization problem depends on the available time period for the convergence of the solution and the Time Complexity, which expresses, for each possible input length, the largest amount of time needed by the algorithm to solve a problem instance of that size.

Considering the scope of the optimization of the SSP, here applied to the subset of the acquisition tasks only, the Time Complexity is associated with the Plan Complexity, which identifies the maximum amount of conflicts in scans to be solved among tasks performable in one and the same mission plan. The Plan Complexity is not easy to be estimated a priori, because it is dependent on the complete exploitation of the full set of the satellite resources in agreement with the mission objectives. However, assumptions about the potential amount of conflicts expected during the optimization process can be obtained based on combinatorial theory.

An evaluation of the number of conflicts is certainly crucial for gaining the combinatorial potentials of achieving satisfactory solutions once the problem research space is identified. As stated by the theory, an unconfined search tree could be explored in N! different ways, but a number of constraints generally limit the search to a more restricted number of solutions, even so strongly dependent on the number of tasks (N) related to the same research space. For the specific SSP, under the hypothesis of a well-designed satellite in terms of resource capacity, a PW may represent the full research space in which an acquisition task can be potentially fulfilled by consuming an amount of satellite resources.

Thus, considering N scan tasks relevant to the same PW, the maximum number of solutions resulting for a theoretically highest number of conflicts (C) equal to $$C_{max} = \frac{(N-1)^2}{2}$$

is $n_{SOL} = C_{max}!$, while the maximum number of iterative steps is obtained by summing all the hypothetical steps needed for a tree level, which can be limited to infinity as:

$$n_{steps} = \left(1 + 1 + \frac{1}{2!} + \frac{1}{3!} + \ldots + \frac{1}{(N-1)!}\right) C_{max}! < \sum_{i=0}^{\infty} \prod_{j=1}^{i} \frac{C_{max}}{i} = e \cdot C_{max}!. \quad (1)$$

This result attests that the Plan Complexity is dramatically dominated by the number of the tasks involved in the conflicts. By calculation, the maximum number of iterations can be related to the number of conflicting tasks through the relationship:

$$n_{steps} = (N-1) \prod_{i=2}^{N} (i!)^{f(i)}, \quad (2)$$

where $f(i)$ (with i=2, ..., N) is the number of events concerning a number of i conflicting tasks respectively.

More practically, a set of conflicting ARs can be sequentially scanned in a number of different modes equal to the number of permutations allowed for the conflict. The complete solutions set to be explored for a certain time domain depends on the number of AR tasks ($n_{Ci}$) involved in each of the (i=1, ..., C) conflicts resulting between relevant DTOs, as:

$$n_{SOL} = \prod_{i=1}^{C} n_{Ci}!. \quad (3)$$

An example of multiple conflicts between DTOs is shown in FIG. 1, wherein 72 different solutions have to be explored for an example of 3 conflicts.

As previously stated, the complexity to be managed by the scheduling strictly depends on the combinatorial possibilities given by the maximum number of potential conflicts in a plan that, in the worst case, shall be managed within the same PW. According to those assumptions, the Plan Complexity of a SSP statistically depends on the number of combinations ($c_{PW}$) resulting between the number of conflicting tasks within a PW:

$$C_P \propto c_{PW} = \prod_{n=1}^{C} (n!)^{f(n)}, \quad (4)$$

where $f(n)$ is the frequency of the conflicts between n tasks, with $n \subseteq N$.

From the combinatorial basics, the permutations coming from the conflicts of n tasks (n!) can be easily represented as a set of permutations of the tasks taken 2 by 2 at a time; thus there results:

$$\binom{n}{2} = \frac{n!}{2(n-2)!}. \quad (5)$$

Thanks to these assumptions, it is possible to bring back each multiple conflict as singular conflicts $f(2)$ between 2 tasks.

Assuming standard ranges typically imposed to the DTOs and PW intervals, the frequency distribution of the single conflicts for a set of N tasks randomly distributed is illustrated in FIG. 2. In particular, FIG. 2 shows probability distribution of conflicts frequency $f(2)$ between $20 \leq n \leq 50$ DTOs (each lasting, on average, 100 s) in an average PW (1200 s)—105 iterations each.

According to the outcomes illustrated in FIG. 2, a Gaussian distribution of the conflicts shows that the function relevant to the frequency of the single conflicts spreads on a greater average value as the number of tasks increases.

By applying equation (4) for the average $f(2)$, the analysis identifies a minimum of $c_n = 292$ combinations for 20 tasks to about $c_n \approx 10^{15}$ combinations for 50 tasks. The resulting number of conflicts theoretically covers the complete search space that has to be investigated through an exact algorithm in order to guarantee an exact optimal solution.

It is clear that a deterministic analysis, which needs to explore at least a relevant portion of the conflicts branches, is unfeasible if applied for a high number of tasks in the nominal period of a Scheduling Session, also for the most efficient exact algorithms of $O(2^n)$. This means that, for large research spaces and for problems NP-Hard as SSPs, it is dramatically difficult to obtain an exact solution to the problem.

Moreover, despite the analysis of the Plan Complexity is an important point in the analysis of a SSP, it is not easy to identify all the critical aspects that could influence the research of optimal solutions.

Thence, a general object of the present disclosure is that of alleviating, at least in part, the technical drawbacks of the methodologies currently used to solve Satellite Scheduling Problems (SSPs).

In particular, a first specific object of the present disclosure is that of providing a methodology such that to solve the SSPs within satisfactory time intervals.

Additionally, a second specific object of the present disclosure is that of providing a methodology such that to avoid a persisting stay in local optima by frequently enlarging investigation in the solution research space and by identifying a set of initial solutions having a large internal diversity which allow to cover a wide area of the research space.

These and other objects are achieved by the present disclosure in that it relates to a satellite scheduling method, as defined in the appended claims.

In particular, the satellite scheduling method according to the present disclosure includes:

a) producing initial scheduling plans on the basis of input requests related to tasks to be performed within a given time period by one or more remote sensing satellites; wherein in each of said initial scheduling plans respective tasks are scheduled, which do not conflict with each other in time and in using satellite resources of the remote sensing satellite(s); and wherein each of the tasks to be performed is scheduled in at least one of the initial scheduling plans;

b) applying a genetic-algorithm-based processing to the initial scheduling plans to produce a genetic-algorithm-based scheduling plan which:
  is globally optimized with respect to given mission objectives, and
  complies with given constraints related to the satellite resources, to the tasks to be performed, and to the given time period; and c) applying a simulated-annealing-based processing starting from the genetic-algorithm-based scheduling plan to produce a simulated-annealing-based scheduling plan,
  that fits the given mission objectives,
  that complies with the given constraints, and
  in which a larger number of tasks is scheduled than in the genetic-algorithm-based scheduling plan.

In particular, the step b) includes carrying out a genetic-algorithm-based iterative procedure comprising:
  at a first genetic-algorithm-based iteration,
    selecting a subset of the initial scheduling plans on the basis of the given mission objectives, and
    applying crossover, mutation and elitism techniques based on respective predefined genetic evolution factors to the selected sub-set of the initial scheduling plans to produce evolved scheduling plans complying with the given constraints;
  at each genetic-algorithm-based iteration following the first one,
    selecting, on the basis of the given mission objectives, a subset of the evolved scheduling plans produced at the preceding genetic-algorithm-based iteration, and
    applying the crossover, mutation and elitism techniques to the selected sub-set of the evolved scheduling plans produced at the preceding genetic-algorithm-based iteration to produce new evolved scheduling plans complying with the given constraints.

Moreover, said step b) includes also:
  stopping carrying out the genetic-algorithm-based iterative procedure when given genetic-algorithm-related stopping criteria are met; and
  automatically selecting, among the evolved scheduling plans produced at the last genetic-algorithm-based iteration performed, the one which best fits the given mission objectives.

Additionally, the satellite scheduling method includes also:
  computing an intersection matrix representing conflicts in time and in using the satellite resources of the tasks to be performed within the given time period;
  computing a plan complexity on the basis of the intersection matrix; and
  computing the given genetic-algorithm-related stopping criteria on the basis of the intersection matrix; wherein the initial scheduling plans are produced on the basis of said intersection matrix.

Preferably, the step c) includes carrying out a simulated-annealing-based iterative procedure comprising:
  at a first simulated-annealing-based iteration,
    selecting, according to one or more predefined probability functions, a task not scheduled in the genetic-algorithm-based scheduling plan,
    identifying a neighborhood of the selected task, wherein the identified neighborhood includes a set of conflicting tasks not scheduled in the genetic-algorithm-based scheduling plan,
    performing permutations of the conflicting tasks in the identified neighborhood,
    applying a simulated annealing technique to outcomes of the performed permutations to find tasks that:
      are not scheduled in the genetic-algorithm-based scheduling plan,
      are schedulable along with the tasks already scheduled in said genetic-algorithm-based scheduling plan,
      fit the given mission objectives, and
      comply with the given constraints, and
    producing a scheduling plan including the found tasks;
  at each simulated-annealing-based iteration following the first one,
    selecting, according to the predefined probability function(s), a further task not scheduled in the scheduling plan produced at the preceding simulated-annealing-based iteration,
    identifying a neighborhood of the further task selected, wherein the identified neighborhood includes a set of conflicting tasks not scheduled in the scheduling plan produced at the preceding simulated-annealing-based iteration,
    performing permutations of the conflicting tasks in the identified neighborhood,
    applying the simulated annealing technique to outcomes of the performed permutations to find tasks that:
      are not scheduled in the scheduling plan produced at the preceding simulated-annealing-based iteration,
      are schedulable along with the tasks already scheduled in said scheduling plan produced at the preceding simulated-annealing-based iteration,
      fit the given mission objectives, and
      comply with the given constraints, and
    producing a new scheduling plan including the found tasks.

Moreover, said step c) preferably includes stopping carrying out the simulated-annealing-based iterative procedure when given simulated-annealing-related stopping criteria are met; wherein the simulated-annealing-based scheduling plan is the scheduling plan produced at the last simulated-annealing-based iteration performed.

Conveniently, the satellite scheduling method further includes computing the given simulated-annealing-related stopping criteria on the basis of the intersection matrix.

Additionally, the present disclosure concerns also a processing system for Earth Observation (EO) systems including one or more remote sensing satellites, which processing system is programmed to carry out the satellite scheduling method according to the present disclosure (thereby resulting in said processing system being configured to operate as a Mission Planner (MP) for said EO systems).

BRIEF DESCRIPTION OF THE SEVERAL VIEWS OF THE DRAWINGS

For a better understanding of the present disclosure, preferred embodiments, which are intended purely by way of non-limiting examples, will now be described with reference to the attached drawings (all not to scale), wherein.

DETAILED DESCRIPTION

Definitions

Figure 1:
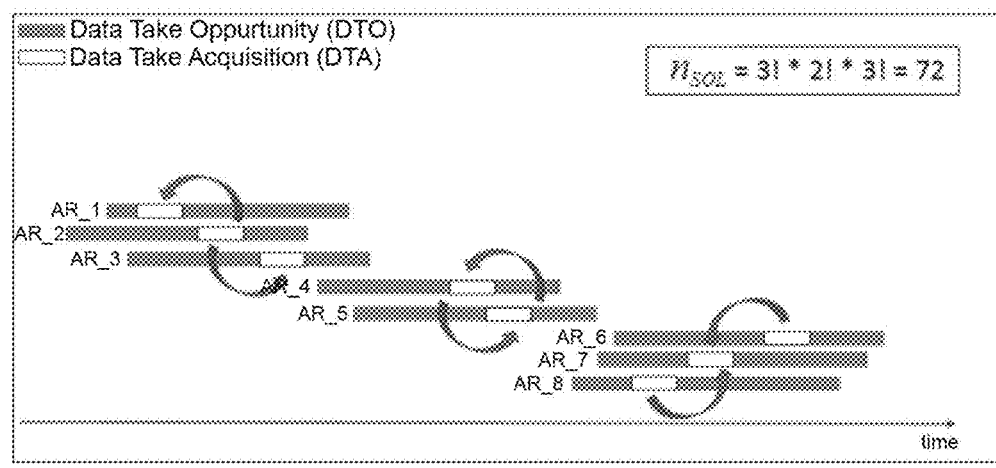
FIG. 1 schematically illustrates an example of multiple conflicts between DTOs.
Figure 2:
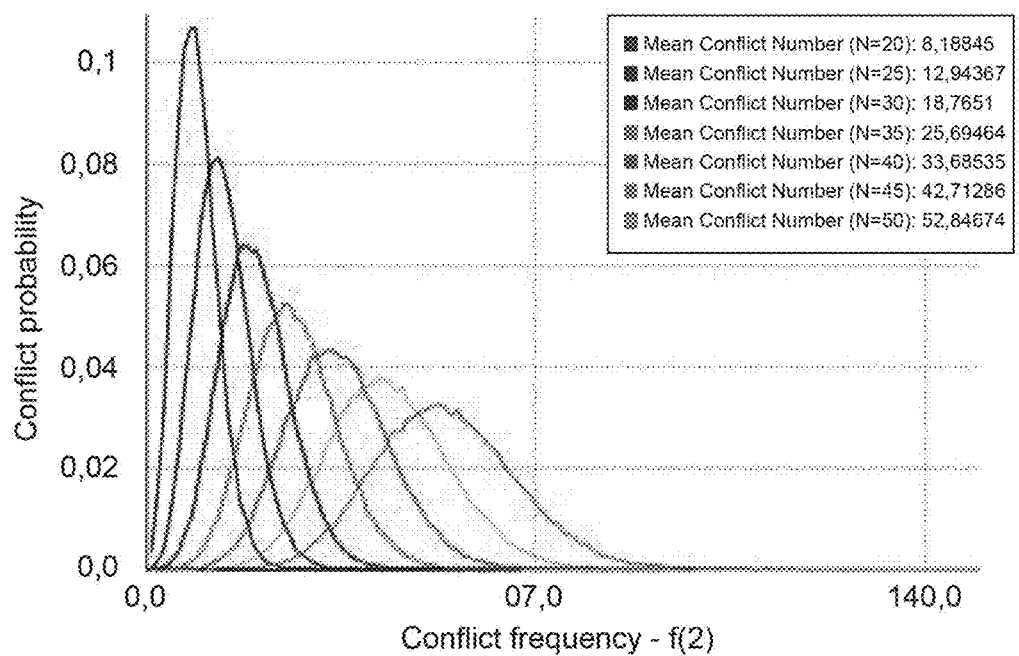
FIG. 2 shows frequency distribution of single conflicts for a set of N tasks randomly distributed.

The following description of the present disclosure will refer to several mission planning elements related to satellite missions. Thence, for the sake of description clarity, conventional definitions of said mission planning elements are provided hereinafter:

a "Scheduling Session" represents the available time interval exploited by a Mission Planner (MP) for an optimal scheduling of the acquisition and download tasks according to existing constraints;

the "Mission Horizon" (MH) represents the period of interest of the scheduling activity (nominally, 24 or 48 hours);

an "Operational Window" (OW) is a sub-portion of the MH and is a continuous time interval allocated for the acquisition and/or uplink and download activities; an OW can include a "Planning Window" (PW) for the acquisition of image data, an "Uplink/Downlink Window" (UW or DW), or a combination of them;

a "Programming Request" (PR) represents an input user request, including acquisition parameters in terms of "Area of Interest" (AoI) and acquisition constraints (such as optical constraints) to be satisfied within a specified validity period;

an "Acquisition Request" (AR) is a geometrical sub-portion of a PR AoI, suitably built in order to enable its scan from satellite orbital point of view; an AR is shaped, sized and oriented according to the satellite "Guidance Profile" and its payload features;

the "Rank" represents the relative acquisition priority of an AR with respect to the set of ARs relevant to the MH to be scheduled, in agreement with users' needs and importance; this value outcomes from a ranking process carried out before a Scheduling Session;

a "Data Take Opportunity" (DTO) represents a continuous envelope of time in which an AR is acquirable during a satellite orbit passage over its area;

a "Rallying Maneuver Opportunity" (RMO) represents a theoretical envelope of time within which is feasible to plan a rallying maneuver to perform a scan of an AR with respect to a reference attitude (e.g., attitude of minimum drag) and return back at the end;

a "Data Take Acquisition" (DTA) represents the sub-portion of a DTO effectively used for an AR acquisition;

a "Rallying Maneuver Activity" (RMA) represents the amount of time necessary for reaching the satellite attitude at the start of a DTA;

a "DownLoad Activity" (DLA) represents the amount of time necessary for the download of an AR image to available mission ground stations;

a "Task" is here generally defined as the set of activities necessary for the accomplishment of a scan or a download of an AR.

The following discussion is presented to enable a person skilled in the art to make and use the disclosure. Various modifications to the embodiments will be readily apparent to those skilled in the art, without departing from the scope of the present disclosure as claimed. Thence, the present disclosure is not intended to be limited to the embodiments shown and described, but is to be accorded the widest scope consistent with the principles and features disclosed herein and defined in the appended claims.

In general, the present disclosure relates to an innovative application of heuristic algorithms to satisfactorily solve the Satellite Scheduling Problem (SSP) in agreement with specific mission requirements.

In particular, the present disclosure concerns a hybrid strategy properly combining Genetic Algorithm and Simulated Annealing (GASA) so as to optimize the scheduling of a given set of Programming Requests (PRs) to be acquired, each one properly sized in Acquisition Requests (ARs) according to the acquisition features of the satellite, inside precomputed acquisition opportunities, named DTOs, within a predefined set of satellite Planning Windows (PWs), that are, as previously defined, sub-portions of the Mission Horizon (MH) for which the SSP is solved.

In particular, the Genetic Algorithm (GA) guarantees a qualitative large-scale convergence and allow the planning of a primary set of scans in the neighborhoods, according to the basic constraints given by a custom Satellite Model (SM) relevant to the specific satellite. GA explores the entire MH domain and globally analyzes the combination of the opportunities of the tasks to be planned, converging to a fine solution in terms of a cost function. All the ARs, which can be scheduled without a significant effort in acquisition, are set in agreement with the fitness functions outcomes. To this end, with an adequate accurateness, GA best solutions are obtained after a restricted number of iterations. On the other hand, due to the algorithm features, Simulated Annealing (SA) is successively involved in the local optimization steps in order to suitably solve the scan conflicts for the remaining ARs tasks. Best effort solutions are obtained within a predicted time interval thanks to the annealing convergence properties.

Thence, according to the present disclosure, in order to take advantage of both the highlighted optimization features, an integrated heuristic strategy which consecutively exploits GA and SA (GASA) has been developed by the Applicant and applied to global scheduling. The heuristic process bases on a sequential usage of suitably adapted GA and SA in order to exploit the respective strengths. GASA allows to obtain an improvement in solutions' quality and a reduction in execution times compared with the outcomes obtained by applying a proper deterministic method to real mission scenarios having different complexities.

In the following, a preferred embodiment of the present disclosure specifically related to optical satellites (i.e., satellites equipped with optical sensors) will be described in detail by way of non-limiting example, remaining it understood that the present disclosure can be advantageously applied, without any substantial modification, also to satellites provided with other types of sensors, such as SAR and LiDAR sensors.

Figure 3:
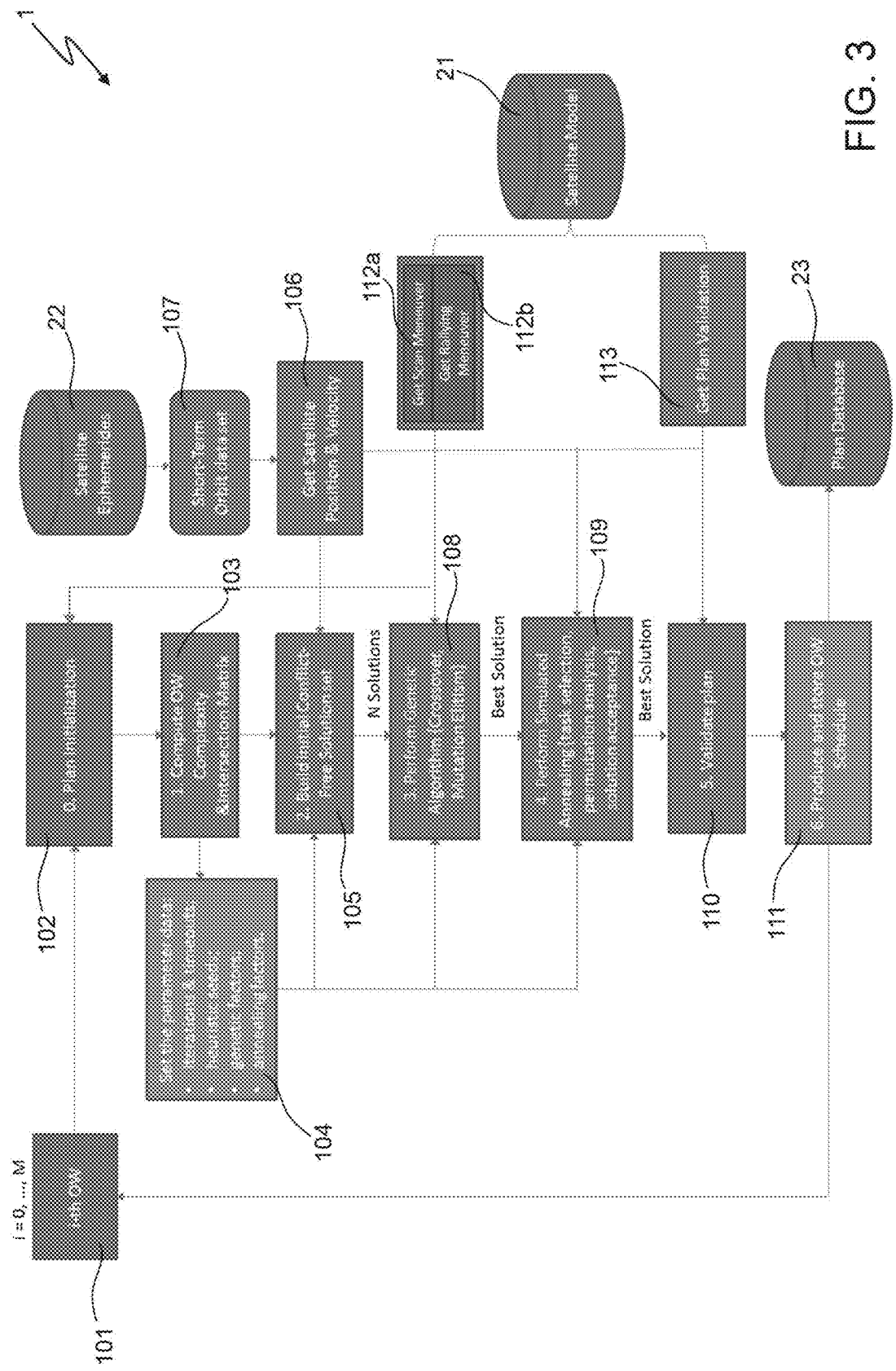
FIG. 3 schematically illustrates a satellite scheduling method according to a preferred embodiment of the present disclosure.

FIG. 3 schematically illustrates, by means of a flowchart, a satellite scheduling method (denoted as a whole by 1) according to a preferred embodiment of the present disclosure, wherein said satellite scheduling method is conveniently used (as previously explained, by way of non-limiting example) to schedule acquisitions performed by an optical satellite. For the sake of generality, a generic OW is here considered as the scheduling interval under investigation.

In particular, the global scheduling strategy of the satellite scheduling method 1 is based on available orbit data sets, once the Sun local positions for the period of interests are known, and is applied to each OW of the MH of interest. An efficient procedure is performed in order to identify start and stop times of the best DTAs relevant to the best set of ARs according to the mission objectives. This procedure allows the minimization of the numbers of queries to the Satellite Model (SM) (denoted by 21 in FIG. 3) for validating each planned scan and rallying maneuver and, at the end, the final plan.

In detail, for each MH under investigation, the satellite scheduling method 1 includes:

setting the next OW in the list (block 101 in FIG. 3) and initializing the plan (block 102 in FIG. 3) on the basis of the satellite resources status resulting from the previous OW scheduling;

computing the Plan Complexity of the OW (block 103 in FIG. 3) in order to set the parameter data (block 104) relevant to the following processing steps, wherein said parameter data preferably include number of iterations and timeouts, heuristic seeds, genetic factors and annealing factors; in particular, the processing step 103 of the satellite scheduling method 1 is carried out by computing and analyzing a properly defined Intersection Matrix between the acquisition tasks; for further details related to the processing step 103 of the satellite scheduling method 1, reference can be made to the paragraph 2 hereinafter;

building an initial set of conflict-free solutions (block 105 in FIG. 3), for which all the feasible ARs have been planned at least in one solution; in particular, the processing step 105 of the satellite scheduling method 1 is carried out on the basis of the SM 21 and orbit data (block 106 in FIG. 3) related to the optical satellite (specifically, position and velocity thereof), which are obtained from a respective short-term orbit data set (block 107 in FIG. 3) resulting, in turn, from satellite's ephemerides (block 22 in FIG. 3); for further details related to the processing step 105 of the satellite scheduling method 1, reference can be made to the paragraph 3 hereinafter;

performing a Genetic-Algorithm-based (GA-based) processing (block 108 in FIG. 3) starting from the initial set of conflict-free solutions; in particular, as described in the paragraph 4 hereinafter, in the GA-based processing step 108 of the satellite scheduling method 1, according to relevant probability factors, solutions evolve by handling proper crossover, mutation and elitism techniques in agreement with the SM 21, and are compared and selected to meet Mission Objectives (for further details related to the Mission Objectives, reference can be made to the paragraph 1 hereinafter);

performing a Simulated-Annealing-based (SA-based) processing (block 109 in FIG. 3) starting from the best solution in terms of Mission Objectives; in particular, as described in the paragraph 5 hereinafter, in the SA-based processing step 109 of the satellite scheduling method 1, the solution evolves following specific methods of selection and permutation of the tasks in agreement with the constraints given by the SM maneuver rules, and each solution is finally evaluated to be accepted for the next iteration with respect to the typical SA criteria, according to the Mission Objectives (again, for further details related to the Mission Objectives, reference can be made to the paragraph 1 hereinafter);

refining acquisitions reference times to improve quality of planned images to be successively downloaded within predefined DWs, if existing, and validating the final solution in agreement with the SM validation rules (block 110 in FIG. 3); and producing and storing (block 111 in FIG. 3) the best schedule on a Plan Database (denoted by 23 in FIG. 3) and, then, returning to the method step 101 for the next OW.

A further aspect of the present disclosure concerns a Mission Planner (MP) for Ground Segments of EO satellite systems, which MP is designed to carry out the satellite scheduling method 1.

Preferably, the MP is based on an OSGI (Open Service Gateway Initiative) JAVA architecture, thereby being a modular system and a service platform implementing a complete and dynamic component model and operating in a Client/Server context, in which the different scheduling services are carried out, on demand, by specific modules (also known as bundles) whose lifecycles are independent of each other.

Figure 4:
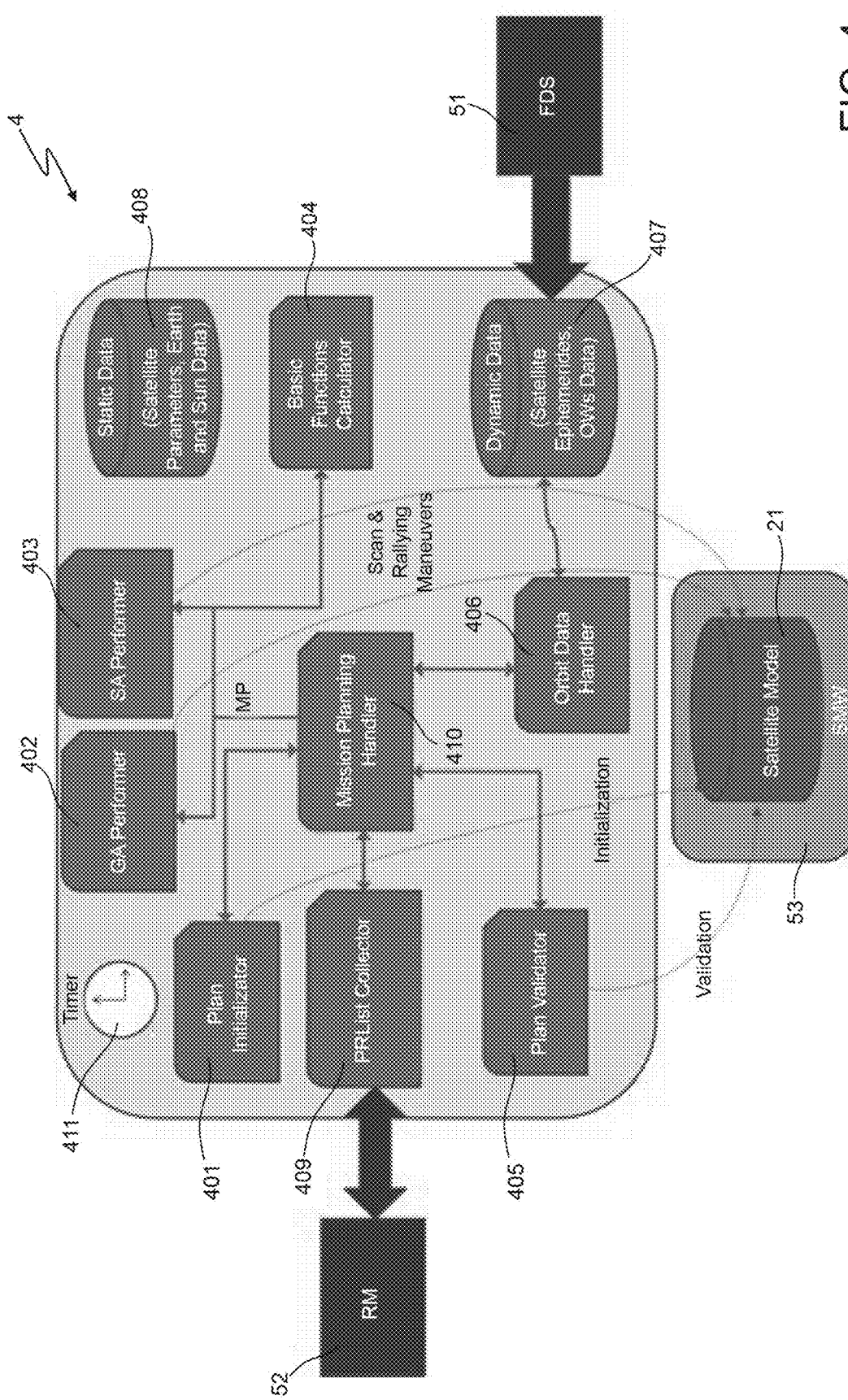
FIG. 4 schematically illustrates a Mission Planner according to a preferred embodiment of the present disclosure.

In this connection, FIG. 4 shows a block diagram representing a functional architecture of a MP (denoted as a whole by 4) according to a preferred embodiment of the present disclosure.

In particular, the MP 4 includes:
- a plan initialization module (or bundle) (in FIG. 4 named Plan Initializator and denoted by 401) operable to carry out the processing steps 102, 103 and 105 of the satellite scheduling method 1, namely operable to perform the plan initialization, to compute and analyze the plan complexity and the Intersection Matrix, and to build (i.e., compute) the initial set of conflict-free solutions;
- a GA processing module (or bundle) (in FIG. 4 named GA Performer and denoted by 402) operable to carry out the GA-based processing step 108 of the satellite scheduling method 1;
- a SA processing module (or bundle) (in FIG. 4 named SA Performer and denoted by 403) operable to carry out the SA-based processing step 109 of the satellite scheduling method 1;
- a computing module (or bundle) (in FIG. 4 named Basic Functions Calculator and denoted by 404) operable to provide basic computing resources to the GA Performer 402 and the SA Performer 403;
- a plan validation module (or bundle) (in FIG. 4 named Plan Validator and denoted by 405) operable to carry out the processing step 110 of the satellite scheduling method 1, namely operable to perform the final plan validation;
- an orbit data handling module (or bundle) (in FIG. 4 named Orbit Data Handler and denoted by 406), operable to provide satellite's ephemerides and OWs data from a dynamic data database 407 connected to a Flight Dynamics System (FDS) 51;
- a static data database 408 storing satellite's parameters, and Earth and Sun data;
- a module (or bundle) for collecting the Programming Requests (PRs) (in FIG. 4 named PRList Collector and denoted by 409) received from a Request Manager (RM) 52; and
- a master bundle (in FIG. 4 named Mission Planning Handler and denoted by 410) operable to control and coordinate the activation and termination of the other bundles.

In detail, once invoked by the RM 52, the MP 4 collects (by means of the PRList Collector 409) the list of PRs, the orbital and OWs data (by means of the dynamic data database 407) relevant to the MH under investigation and activates the global scheduling strategy (i.e., the satellite scheduling method 1) for the subset of the PRs to be scheduled. The Mission Planning Handler 410 is in charge of the synchronization of the activities, invoking the start and stop of the specific services according to internal timeouts (Timer 411 shown in FIG. 4).

Thanks to the modularity and independency of the Mission Planner 4 with respect to the particular mission, it is possible to minimize the customization for different applications. To this end, the Satellite Model (SM) 21 represents an external element which is invoked from the modules when necessary. Interactions with the SM 21 are preferably performed by adopting a specific SM Wrapper (SMW) (in FIG. 4 denoted by 53) which handles the different queries according to the specific model features.

Based on hardware environment and performance of the Satellite Model 21, a tuning of the algorithmic parameters can be conveniently performed in order to optimize the robustness and accuracy of the application. In this connection, reference can be made to the paragraph 6 hereinafter.

The different aspects of the satellite scheduling method 1 implemented by the MP 4 will be described in detail in the following.

1. Mission Objectives

In the SSP optimization, the heuristic process is guided by the multiple objectives to be fulfilled which are modeled by a weighted multi-objective functions, where an objective function $f: X \to Y$ is a mathematical function that is subject to optimization. The codomain Y of an objective function as well as its range is a subset of the real numbers ($Y \subseteq R$), while the domain X of $f$ is here called the SSP research space.

The scheduling optimization comprises all techniques that can be used to find the best elements x* in X with respect to such objective criteria $f \in F$. Thus, the optimization aim is to find the best strategy x* for the assignment of the resources to the tasks in order to satisfy the constraints, by optimizing the objectives in a predefined scheduling period.

For a complex multi-objective SSP, there may not exist a single solution that simultaneously optimizes each objective. In that case, the objective functions are said to be conflicting, and there results a multiple number of Pareto optimal solutions. A solution is called non-dominated, Pareto optimal, Pareto efficient or non-inferior, if none of the objective functions can be improved in value without degrading some of the other objective values. Without additional subjective preference information, all Pareto optimal solutions are considered equally good. For this reason the definition of "the best solution", due to the intrinsic Pareto approach character, is not applicable.

Thus, for the SSP under investigation, it is necessary to retrieve methods which convert the original problem with multiple objectives into a single-objective optimization problem. This is known as a scalar problem. If the scalarization is done carefully, Pareto optimality of the obtained solutions can be guaranteed (in this connection, reference ca be made to Y.-R. Lee, A. Stam, P.-L. Yu, *Dominance Concepts in Random Outcomes*, $2^{nd}$ chapter (pp. 23-43) of P. Serafini, *Mathematics of Multi Objective Optimization*, Vol. 289 of the series International Centre for Mechanical Sciences, doi: 10.1007/978-3-7091-2822-0_2).

The most effective and simple method to define a single objective is computing a linear scalarization F(x) as a sum of all the functions $f_i(x) \in F$. Each objective $f_i$ is multiplied by a weight $w_i$ representing its relative worth in the $N_{Obj}$ set. The use of signed weights also allows to minimize one objective and to maximize another. Either way, the multi-objective problem is reduced to a single-objective one:

$$F(x) = \sum_{n=1}^{N_{Obj}} w_n f_n(x_n), \tag{6}$$

where the optimal value of F, named fitness function, results for the best value of $x^* \in X^*$ which allows the minimization of $F(x^*) \leq F(x) \ \forall x \in X$.

To the scheduling optimization aims, the cost function is modelled according to the mission requirement(s) and taking into consideration all the overall satellite features. In particular, the $f_i(x) \in F$, called Mission Cost Functions (MCFs), are modeled and tuned in agreement with the constrained renewable and non-renewable resources, which are typically in conflict each other, in terms of at least:

Task priority ($p_T$), that is defined through a relative priority Rank in the schedulable PW and imposed a priori (typically by a ranker of the Request Manager subsystem 52) for the set of the $N_T$ planned tasks, where a lower index means higher precedence; this means that, in case of conflict and under the same condition, the MP 4 gives a precedence in the scheduling of priority tasks, according to a specific MCF;

Maneuvering time ($t_M$) consumption, proportional to the maneuvering time $t_{Mij}$ between tasks i and j; this MCF gives more relevance to faster than slower RMAs for the acquisition of an AR;

Maneuvering power ($W_M$) consumption, proportional to the maneuvering power $W_{Mij}$ between tasks i and j; this MCF tends to minimize the power effort in the RMAs for the fulfillment of an acquisition;

On-Board Record storage ($S_{OBR}$), proportional to the instantaneous on-board storage $S_{OBR}$; this MCF tends to limit the size of the images stored on the On-Board Record (OBR);

Image quality in terms of average acquisition Ground Sampling Distance (GSD); this MCF tends to give more relevance to the images acquired with higher geometric quality.

Reference values of the resources parameters are imposed for the normalization of the relevant MCFs $0 \leq f_i(x) \leq 1$. In particular:

$N_{TTot}$ is the total number of tasks to be processed within a PW;

$$t_{MMax} = \frac{L}{V_{MMin}}$$

is the maximum maneuvering time by adopting a minimum maneuvering velocity $V_{M\ Min}$ necessary for the maneuver between two on-ground task points having distance L, which is given by the SM 21;

$S_{OBR_{Max}} = S_{OBR} * f_{S_{Orb}}$, where $f_{S_{Orb}} < 1$ is the maximum fraction of OBR size designed to be allocated for one orbit pass;

$W_{M\ Max} = W_{M\ Orb}$, where $W_{M\ Orb}$ is the power budget assigned for 1 orbit pass, which is given by the SM 21;

$D_{Min} = GSD_N/\cos(\alpha_{Max})$ is the worst GSD available for the acquisition of an AR at a maximum acquisition angle $\alpha_{Max}$, which is given by the SM 21.

In this way, a weighted local cost function, named Task Fitness $F_T(x)$ can be associated to each scheduled task ($T_j$), according to the $N_{Obj}$ mission objectives:

$$F_T(x) = \sum_{n=1}^{N_{Obj}} w_n f_n(T) = \quad (7)$$

$$w_1 \frac{1}{2^{N_{TTOT}-P_T}} + w_2 \frac{t_{Mj}}{t_{MMax}} + w_3 \frac{S_{OBRj}}{S_{OBRMax}} + w_4 \frac{W_{Mj}}{W_{MMax}} + w_5 \frac{GSD_j}{GSD_{Min}}$$

where for the weighted factors there results $$\sum_{n=1}^{N_{Obj}} w_n = 1.$$

At this time, the main criterion that leads the scheduling is a global cost function, named Solution Fitness $F_S(x)$, which links the MCFs to the set of tasks $T_j \in N_{TSched}$ scheduled within a PW, and is computed as:

$$F_S(x) = \sum_{n=1}^{N_{Obj}} w_n f_n \left( \sum_{m=1}^{N_{TSched}} T_m \right) = \quad (8)$$

$$\sum_{j=1}^{N_{TSched}} \left( w_1 \frac{1}{2^{N_{TTOT}-P_{Tj}}} + w_2 \frac{t_{Mj}}{t_{MMax}} + w_3 \frac{S_{OBRj}}{S_{OBRMAX}} + w_4 \frac{W_{Mj}}{W_{MMAX}} + w_5 \frac{GSD_j}{GSD_{Min}} \right)$$

where the variable x now corresponds to the global set of already planned tasks $$\sum_{m=1}^{N_{TSched}} T_m.$$

However the modelling of the MCFs is not sufficient for guiding the optimization to a satisfactory solution. In the opposite way with respect to the SSP optimization wishes, the minimization of $F_S$ would lead to find best solutions having empty plans with no tasks scheduled.

Thence, it is important to impose the so-called Penalty Cost Functions (PCFs) proportional to the set of not scheduled tasks. This is important for the maximization of the number of tasks to be scheduled. The goal is to guarantee that each task fulfilled in the worst acquisition conditions would cost less than if not scheduled at all. Thus a PCF having value equal to $N_{Obj}$ is substituted to a j-th task which is not scheduled at each optimization step.

The combination of the MCFs and PCFs resulting for all the set of involved ARs, defines the final multi-objective fitness function, to be minimized during the optimization process. Thus, the optimization goal associated to each PW to be scheduled results:

$$\min[F_G(x)] = \min \left[ \sum_{n=1}^{N_{Obj}} w_n f_n \left( \sum_{m=1}^{N_T} T_m \right) + (N_{TTot} - N_{TSched}) \right]. \quad (9)$$

2. Complexity Analysis

As previously explained, the processing step 103 of the satellite scheduling method 1 includes computing and analyzing the plan complexity by means of a so-called Intersection Matrix.

In particular, a DTO represents the whole interval in which the beginning of the DTA is feasible. An efficient initialization process foresees the building of an Intersection Matrix ($Mat_{Int}$) which involves the DTOs intervals for the MH under investigation. An Intersection Matrix results from the (V)×(V−1) analysis of the binary intersections between VDTOs of the ARs tasks.

Specifically, elements $m_{ij}$ (i≠j) of the $Mat_{Int}$ are filled with:

−1, if $DTO_i$ completely precedes $DTO_j$;
1, if $DTO_i$ completely follows $DTO_j$;
0, if $DTO_i$ intersects $DTO_j$.

This kind of initialization allows the achievement of the number of intersections between the conflicting ARs and then of the complexity of the plan.

Figures 5, 8:
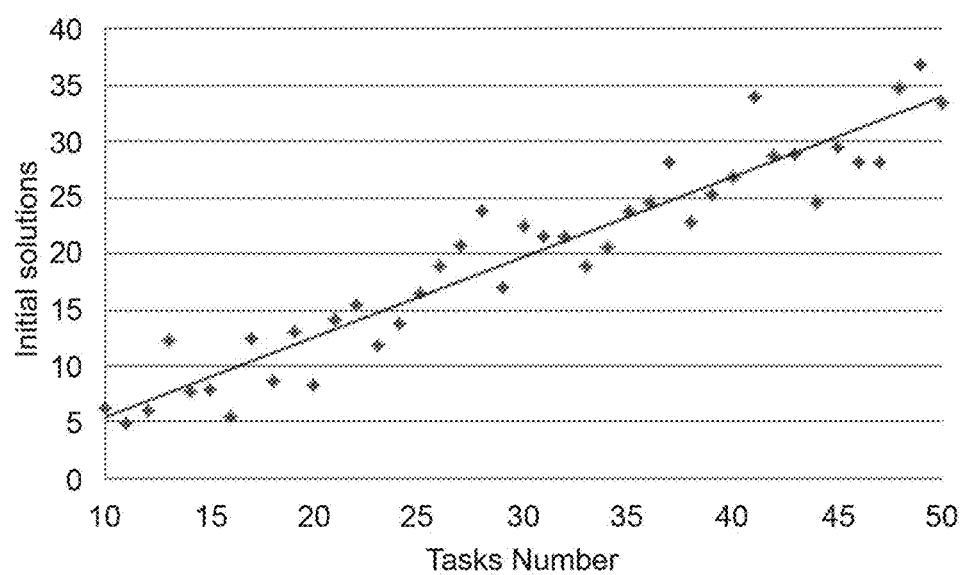
FIG. 5 schematically illustrates an example of schema for initializing an Intersection Matrix for a five-task case.
FIG. 8 schematically illustrates the so-called Extensive Initialization of the conflict-free solutions as a function of the number of input tasks (in particular, from 10 to 50 for a PW of 900 s)
Figure 6:
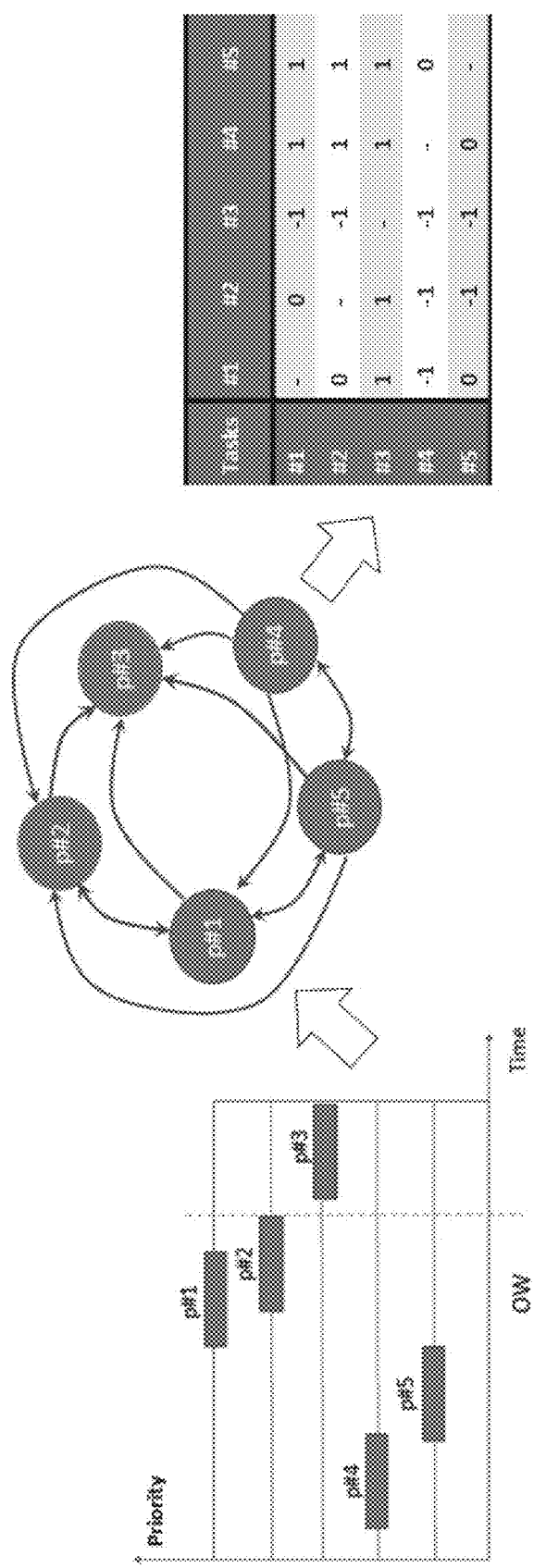
FIG. 6 schematically illustrates an example of conflicts between DTOs in a five-task case.

An example of plan initialization is shown in FIG. 5 for the scheduling of 5 tasks in a reference MH of 1 PW. In this scenario, ARs tasks are ranked by priority (p #). The conflict dependency between DTOs tasks is shown in FIG. 6 by means of a graph composed of arcs between each couple of tasks with single arrow (if no conflict exists) or double arrow (if a conflict is raised), according to the $Mat_{int}$ information.

The above defined Intersection Matrix allows the modelling of a Plan Complexity function ($C_P$), which is associated to the conflicts between DTOs within the given PW of the MH. It is thus related to sum of "0s" raised from the coefficients $m_{ij}$ of the $Mat_{Int}$:

$$C_P = \sum_{i=0}^{N} \sum_{j=i+1}^{N} (m_{ij} + k), \text{ where } \begin{cases} k = 1 & \text{if } (m_{ij} \neq 1) \\ k = -1 & \text{if } (m_{ij} = 1) \end{cases}. \quad (10)$$

Further improvements could be achieved from the preliminary check of the conflicts. In particular, according to the Intersection Matrix, when no chances to combine the DTAs of two subsequent conflicting DTOs are proved, it is possible to simplify the graph complexity. However, in order to obtain this advantage, a number of initial $(N-1)^2$ calculations, in terms of queries to the SM 21, is requested. A minimum overlap is considered according to the satellite agility features. In particular if the intersection time between a couple of DTOs is inferior to a given threshold (i.e., 10 s) the conflict can be neglected.

In the present document, the "Neighborhood" of a scan task (Task Nghd) is defined as the portion of time of the relevant DTO interval which does not conflict with other DTOs in a certain task set. In other terms, it represents the interval in which the influence of a scan can be univocal.

It is a fact that the planned DTAs are feasible only if maneuvers with respect to the predefined attitudes relevant to the acquisition of the preceding and succeeding DTAs are valid accordingly. Thus, wider Task Nghd statistically means higher probabilities for the relevant DTAs to be planned. As a limit, the conflict-free solution represent the locus where every Task Nghd corresponds to the complete DTO interval.

In this way, lower dense solutions with extended intervals of Task Nghds are built, lower effort in their scheduling is requested due to the limited number of DTO conflicts to be analyzed. This feature allows an initial fast design of a profitable set of solutions to be improved in the successive optimization steps.

3. Solutions Initialization

The initialization of the plan is a process necessary for the instance of the statuses of the set of satellite resources available at the beginning of the scheduling activities, according to the specific mission constraints.

In particular, a requirement is that, for the Mission Horizon (MH) of interest, the satellite status is compliant with all the Mission Rules applicable to the plan in order to avoid a priori Mission Failures.

The initialization is performed according to the specific Satellite Model (SM) 21 and, in order to accomplish this task, it is necessary to assess:

the set of the available OWs;
the level of the on-board power;
the available on-board memory;
the set of stored images to be downloaded from previous scheduling.

To be compliant with the pointing performance, it is required to load the set of satellite ephemerides (blocks 22 in FIGS. 3 and 407 in FIG. 4) newly predicted by the Flight Dynamics System 51 for the short-term period of interest (block 107 in FIG. 3) in order to guarantee the minimization of the errors in the satellite positioning. Sun ephemerides and UTC-TAI (Coordinated Universal Time—International Atomic Time) offset are conveniently exploited for the conversions between reference frames and the computation of the Sun angle constraints.

All the sets of data are stored and made accessible every time the SM 21 is queried for the execution of a given task. In order to satisfy the mission requirements which demand to guarantee that every AR relevant to a PW shall be analyzed, a conflict-free solution is built (block 105 in FIG. 3) through the exploitation of the SM 21.

In particular, the processing step 105 of the satellite scheduling method 1 conveniently includes for each PW:

1. selecting a DTO from the set of Task Nghds which firstly conflict in time, according to the Intersection Matrix (i.e., DTOs coming from "0s" in the $Mat_{Int}$);
2. randomly selecting a DTO in the conflicting set and finding a relevant DTA starting from the DTO start time, by using a Scan Maneuver interface (block 112a in FIG. 3) of the SM 21;
3. proceeding chronologically and identifying a next set of conflicting DTOs;
4. randomly selecting a DTO in the conflicting set and finding a relevant DTA starting from the DTO start time, by using the Scan Maneuver interface (block 112a in FIG. 3) of the SM 21;
5. validating the RMA between first and second DTAs, by using a Rallying Maneuver interface (block 112b in FIG. 3) of the SM 21; if the RMA is not valid, the second DTA is postponed until RMA is feasible;
6. putting selected DTAs inside the solution;
7. repeating the above sub-steps 3, 4 and 5 until the ending date of the PW is reached;
8. building a conflict-free solution, then associating a Solution Fitness to it, according to equation (8).

Figure 7:
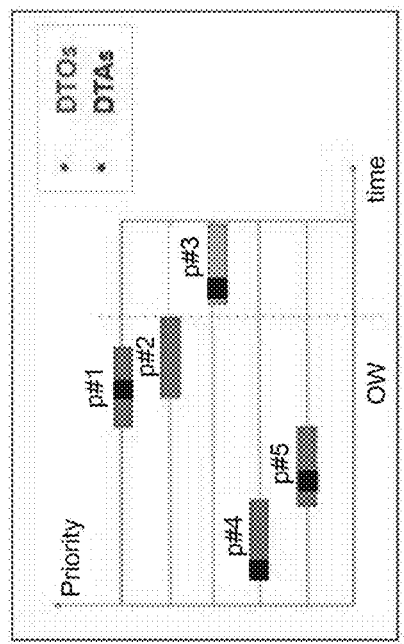
FIG. 7 schematically illustrates an example of the so-called conflict-free solutions computed for a five-task case.
Figure 7:
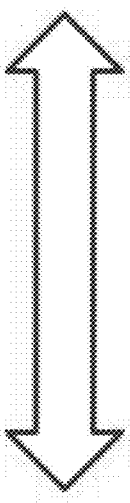
Figure 7:
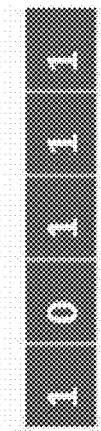

This process allows the minimization of the checks to be executed in terms of number of queries to the SM 21 for the validation of the solution. In this connection, FIG. 7 schematically shows solutions computed by implementing the above processing step 105 for the above 5-task example of FIG. 6, wherein a minimum overlap between tasks has been considered.

A number of solutions is achieved until certain criteria are reached. Due to the necessity to maximize the diversity of the solution set in order to spread the germs in the solutions research space, it is generally required to include each task in at least one solution. This condition is named Extensive Initialization. Practically, it means that each feasible task is scheduled at least once in the conflict-free solution set provided by the initialization process.

A statistical simulation, reported in FIG. 8, shows that the number of requested solutions to fulfill the Extensive Initialization scope, with a good approximation, linearly increases as a function of the number of input tasks.

Conveniently, the tuning of the number of the conflict-free solutions shall take also into account:

the GA requirements in terms of solution population $S_{pop}$ necessary for their evolution;
the final threshold time for the Scheduling Session.

In this way, a trade-off, which considers the defined constraints through combined criteria, is imposed.

In the end, based on computational assumptions, the initialization timeout for reaching an opportune initial solutions set is taken by considering a necessary 95% of probability of gaining an Extensive Initialization of the scans for a number of N tasks per PW. This condition marginally depends on the satellite acquisition performance and the extension of the PW period; indeed, random analyses showed that similar computational times are required for building a small number of longer solutions set (busy with scans) than a larger but shorter set, for a fixed number of input tasks. In other words, the computation effort is considered as a function of the number of input tasks, under the condition of equivalent performance of the Satellite Model (SM) 21.

4. Genetic Algorithms

As is known, in the computer science field of artificial intelligence, the Genetic Algorithms (GAs) of the family of the EAs are heuristic searches that mimic the process of natural selection based on Darwin's theory of survival of the fittest solutions. GAs have been investigated for a long time in connection with scheduling optimization problems, for example by H. Bremermann (see, for example, *A method of unconstrained global optimization*, Mathematical Biosciences, Vol. 9, pp. 1-15, 1970, doi: 10.1016/0025-5564(70)90087-8), whose researches also included the elements of modern genetic processes.

Moreover, further noteworthy early pioneers were R. M. Friedberg (see, for example, R. M. Friedberg, B. Dunham, J. H. North, *A Learning Machine: Part II*, IBM Journal of Research and Development, Vol. 3, No. 3, pp. 282-287, 1959, doi: 10.1147/rd.33.0282) and I. Rechenberg (see, for example, *The Evolution Strategy. A Mathematical Model of Darwinian Evolution*, in Synergetics—From Microscopic to Macroscopic Order, Springer Series in Synergetics, Vol. 22, pp. 122-132, 1984, doi: 10.1007/978-3-642-69540-7_13), who gave the basic ideas of analysis and design based on the concepts of biological evolution, and also J. H. Holland (see, for example, Ref7 and also *Genetic Algorithms and Adaptation*, Adaptive Control of Ill-Defined Systems, pp. 317-333, 1984, doi: 10.1007/978-1-4684-8941-5_21) and D. E. Goldberg (see, for example, Ref5 and also *Genetic Algorithms and Innovation*, The Design of Innovation, Vol. 7 of the series Genetic Algorithms and Evolutionary Computation, pp. 1-9, 2002, doi: 10.1007/978-1-4757-3643-4_1).

GAs simulate the survival of the fittest among individuals over consecutive generations for solving an optimization problem where each generation consists of a population of character strings analogous to the chromosome of the DNA. To continue the genetic analogy, a variable of each chromosome is equivalent to a gene whose character is called allele. Traditionally, genes' alleles are represented as binary characters (0/1), but other encodings are also possible. The locus represents the position of the gene in the chromosome string, while the phenotype represents the properties of the gene determined by its genotype.

The genetic evolution from a state (s) usually starts from a population of randomly generated individuals and proceeds through an iterative processing, where the population computed at each iteration is called a generation. In each generation, a fitness of every individual in the population is evaluated. The most suitable individuals are stochastically selected from the current population, then each individual's genome is modified (recombined and possibly randomly mutated) to form a new generation. The new generation of candidate solutions at state (s+1) is then used in the next iteration of the algorithm. Thus a typical GA requires:

a genetic representation of the solutions and variables domain;

a fitness function to evaluate the solution domain.

Once the genetic representation and the Solution Fitness are applied, the GA proceeds to initialize a population of solutions and then to improve it through evolutionary techniques. A population of solutions is maintained within the search space and then made to evolve for the next iteration based on the task fitness assigned accordingly to the fitness function for the optimization problem to be solved. The aim of the GA is to statistically produce offspring having higher qualities than the parents by combining alleles of the genes relevant to a set of selected chromosomes within the Solution Pool, through proper evolution techniques.

The following traditional GA techniques are adopted in the present disclosure:

crossover (single/multi point)—the recombination of parts of two solutions cut in definite points; in this model each crossover point corresponds to a random time instant within the solution time range; the cut-off points for the crossover are randomly computed within specific time intervals in which Task Nghds of the crossing solutions do not intersect;

mutation—the substitution of a scan with a conflicting one in time, when existing;

elitism—the reproduction of a set of most valuable solutions iteration by iteration.

Commonly, the algorithm terminates when either a maximum number of generations has been produced, a satisfactory fitness level has been reached, or there are no more significant progresses.

In conclusion, the following statements relate to all the algorithms based on GAs:

chromosomes in a population compete for resources and mates;

most valued individuals in terms of fitness produce more offspring than the others, so as to reproduce the best qualities of a population;

genes of the chromosomes candidate for reproduction are combined and propagated throughout the population;

each successive generation will become more suited to their environment.

The steps statistically allow an improvement in the average fitness between the population of successive generations, until the convergence to a fitness value is reached and no significant upgrade of the offspring is noticed.

An efficient representation of each candidate solution in a SSP is given through a standard array of bits [0/1] ordered according to a specific variable. The main property that makes these genetic representations convenient is that their parts are easily aligned due to their fixed size, which facilitates simple crossover operations. However, variable length representations may also be used, but crossover implementation becomes more complex for a tree-like evolution. In the application to the SSP resolution, the genetic elements are associated with scan activities and each one can be linked to a specific feature, as reported in the following TABLE 1:

TABLE 1

Genetic application to SSP

| Genetic Term | Genetic Representation | SSP Application |
|---|---|---|
| Chromosome | String | Solution as a sequence of scan opportunities (DTOs) |
| Gene | Character | Scan opportunity (DTO) |
| Allele | Value | Scan Feasibility (Yes or No) |

TABLE 1-continued

Genetic application to SSP

| Genetic Term | Genetic Representation | SSP Application |
| --- | --- | --- |
| Locus | Array Index | Scan Priority (Rank) |
| Phenotype | Attribute | Scan Maneuver (DTA) |
| Genotype | Attribute | Rallying Maneuver (RMA) |

Each plan solution (chromosome) which includes a set of AR DTOs (genes) represents a possible schedule in the solution domain for a PW having a given set of tasks to be planned in.

By definition, the allele of the gene is equal to "1" if the acquisition of the AR is feasible through a valid DTA (to which a valid RMA is always associated) within the relevant DTO, otherwise it is set to "0".

Figure 9:
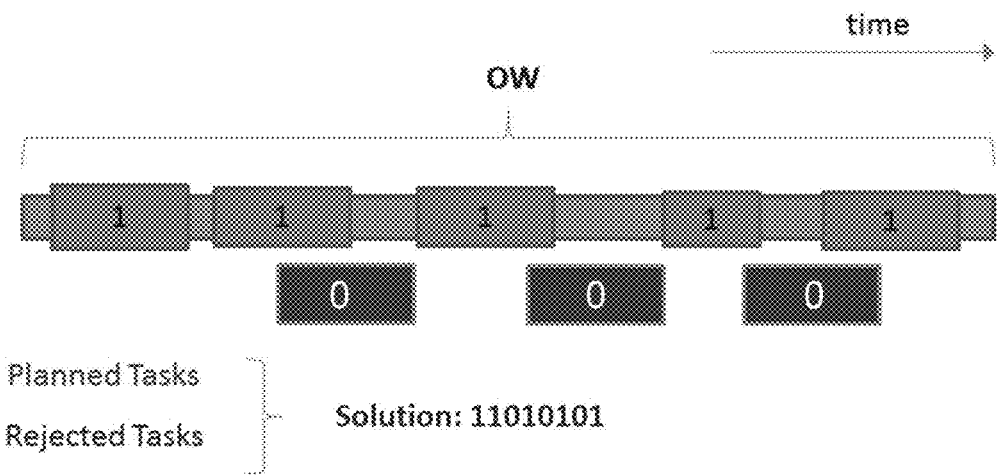
FIG. 9 schematically illustrates an example of a solution for a PW collecting five feasible DTAs.

According to the theory, in the SSP application, the arrays of genes are chronologically ordered with respect to the start time of the DTOs of each task. In this way, a solution corresponds to a sequence of 0s (i.e., "zeros") and 1s (i.e., "ones") according to the feasible and unfeasible DTAs (phenotypes) for the tasks set, as shown in FIG. 9 (which schematically illustrates an example of a solution for a PW collecting 5 feasible DTAs for a set of 8 tasks).

Finally, the genotype is here linked to the RMA necessary for the realization of a feasible DTA.

In the SSP context, the thought is to identify and reproduce a population of valid solutions increasing their fitness values at each generation, where each solution includes a series of non-conflicting DTAs. Solutions are computed in agreement with the associated multi-objective Solution Fitness and can be ranked, ordered and selected according to the relevant fitness.

Each evolution technique is related to a specific genetic factor ($gf_c$ for the crossover, $gf_m$ for the mutation, and $gf_e$ for the elitism) identifying the relevant probability of application during a GA iteration. Ranges are identified according to the standard ones adopted in the state of the art.

Genetic factors are properly tuned according to the particular problem and handled as constants. Nevertheless, the mutation factor $gf_m$ could conveniently vary as a function of the population diversity. If it is not satisfactory, the crossover factor $gf_c$ can be raised as in Adaptive GAs, in order to mainly differentiate the input solutions.

In the following TABLE 2, ranges of probabilities for the genetic factors conveniently exploited by the present disclosure are reported:

TABLE 2

Probability ranges of genetic evolution factors

| Genetic Factor | Description | Probability |
| --- | --- | --- |
| $gf_c$ | Crossover factor | 0.5-0.95 |
| $gf_{cm}$ | Multiple crossover factor | 0.25-0.5 |
| $gf_m$ | Mutation factor | 0.01~0.1 |
| $gf_e$ | Elitism factor | 0.05~0.2 |

Figure 10:
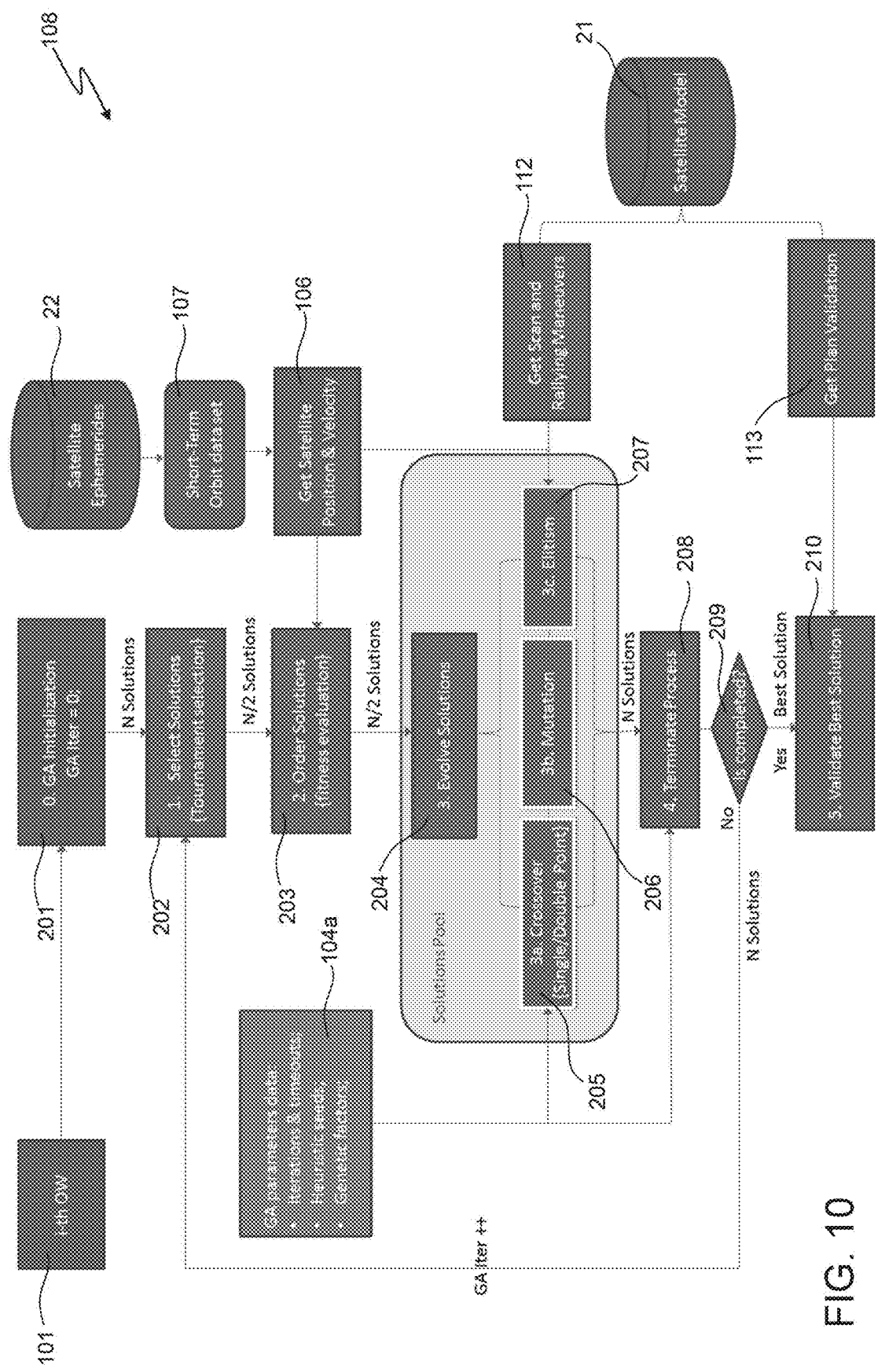
FIG. 10 schematically illustrates a GA-based processing step of the satellite scheduling method of FIG. 3 according to a preferred embodiment of the present disclosure.

FIG. 10 schematically illustrates, by means of a flowchart, the GA-based processing step 108 of the satellite scheduling method 1 according to a preferred embodiment of the present disclosure.

In particular, based on the solutions initialization (i.e., the processing step denoted by 105 in FIG. 3 and described in detail in paragraph 3), once GA parameters in terms of maximum number of iterations, process timeouts, heuristic seeds and genetic factors are set (block 104a in FIG. 10), the GA-based processing step 108 allows to compute multiple solutions through the following sub-steps:

- initializing GA for a given PW (block 201 in FIG. 10), with a population of N conflict-free solutions retrieved through the plan initialization process (i.e., said processing step 105);
- selecting best candidate solutions at state (s) for the reproduction through a proper selection method, named Tournament selection (block 202 in FIG. 10);
- ordering solutions according to their Solution Fitness values (block 203 in FIG. 10) and storing them within a Solution Pool;
- computing and proving solutions candidate to evolve to state (s+1) (block 204 in FIG. 10) according to single and multiple crossover (block 205 in FIG. 10), mutation (block 206 in FIG. 10) and elitism (block 207 in FIG. 10) techniques, on the basis of the Satellite Model (SM) 21 where the Scan and Rallying Maneuvers interfaces are used (blocks 112a and 112b in FIG. 3, corresponding to block 112 in FIG. 10); genetic techniques are applied in agreement with the heuristic seeds and the genetic factors (block 104a in FIG. 10);
- GA terminates (block 208 in FIG. 10) according to the stopping criteria (i.e., maximum number of iterations and process timeouts in block 104a in FIG. 10), in this connection reference can be made to the paragraph 6 hereinafter);
- if the process is completed (block 209 in FIG. 10), the resulting Best Solution is validated (block 210 in FIG. 10) through the Plan Validation interface (blocks 113 in FIGS. 3 and 10) of the Satellite Model (SM) 21; otherwise, the N offspring solutions are established to be the population for the next generation, and the GA-based processing step 108 is again iterated starting from the Tournament selection sub-step 202.

5. Simulated Annealing

The first Simulated Annealing (SA) was developed by S. Kirkpatrick (see, for example, S. Kirkpatrick, C. D. Jr. Gelatt, M. P. Vecchi, *Optimization by Simulated Annealing*, Science, Vol. 220, No. 4598, pp. 671-680, 1983, doi: 10.1126/science.220.4598.671) for global optimization in the early 1980s and performed for various combinatorial optimization problems. Simulated Annealing (SA) is an optimization method that can be applied to arbitrary problem search spaces. Like simple Hill-Climbing algorithms, SA only needs a single initial individual as starting point and a unary search operation. It takes its inspiration from the annealing process in metallurgy and material science, as heat treatment of material with the goal of altering its properties such as hardness. When annealing a metal, the initial temperature must not be too low and the cooling must be done sufficiently slowly so as to avoid the system getting stuck in a meta-stable, non-crystalline state representing a local minimum of energy.

In physics, each set of positions of all atoms of a system configuration is $$P(\Delta E) = \begin{cases} f_B & \Delta E > 0 \\ 1 & \Delta E \le 0 \end{cases}. \quad (11)$$

weighted by its Boltzmann probability factor where E(s) is the energy of the current state (s), T is the cooling Temperature measured in K (i.e., Kelvin), and $k_B$=1.380 650 524·10$^{-23}$ J/K is the Boltzmann's constant.

In previous studies conducted by Metropolis et al. (see, for example, N. Metropolis, A. W. Rosenbluth, M. N. Rosenbluth, A. H. Teller, E. Teller, *Equation of State Calculations by Fast Computing Machines*, The Journal of Chemical Physics, Vol. 21, No. 6, pp. 1087-1090, 1953, doi:10.1063/1.1699114), a Monte Carlo method for calculating the properties of any substance which may be considered as composed of interacting individual molecules was developed. This procedure applies in order to simulate a collection of atoms in thermodynamic equilibrium at a given temperature.

A new nearby geometry at the state (s+1) is generated as a random displacement from the current one (s) of an atom at each iteration. The energy of the resulting new geometry is computed and the Energetic Difference ($\Delta E$) between the current and the new geometry $\Delta E = E(s+1) - E(s)$ is determined. The probability that this new geometry is accepted, $P(\Delta E)$ is defined as:

$$f_B = e^{-\frac{k_B E(s)}{T}},$$

Thence, if the new nearby geometry has a lower energy level, the transition is accepted, otherwise, a uniformly distributed random number $r \in [0, 1)$ is drawn and the step will only be accepted in the simulation if it is less than or equal to the Boltzmann probability factor, $r < P(\Delta E)$, leading chances also to worsen solutions to be selected.

In SA the evolution schedule is typically modelled through a reduction of the cooling Temperature. Temperature decrease rate shall be accurately tuned, in compliance with the problem complexity and the available convergence time. At high temperatures, $f_B$ is very close to 1, leading to the acceptance of many uphill steps. As the temperature falls, the proportion of steps accepted, which would increase the energy level, decreases. On the other hand, when the spent time (6) expires, there results $T(t_s = t_{max}) = 0$, which nullifies $P(\Delta E)$. Now the system will not escape local regions anymore and comes to rest in a local minimum.

Subsequent studies proved that SA algorithms with appropriate cooling strategies asymptotically converge to the global optimum. For example, P. J. M. van Laarhoven, E. H. L. Aarts, *Simulated Annealing: Theory and Applications*, Mathematics and Its Applications, Vol. 37, 1987, doi: 10.1007/978-94-015-7744-1, and A. Nolte, R. Schrader, *A Note on the Finite Time Behaviour of Simulated Annealing*, Operations Research Proceedings 1996, pp. 175-180, 1997, doi:10.1007/978-3-642-60744-8_32, provide lists of the most important works showing that Simulated Annealing will converge to the global optimum if $t \to \infty$ iterations are performed, including the studies of B. Hajek (see, for example, *A tutorial survey of theory and applications of Simulated Annealing*, Proceedings of the 24th IEEE Conference on Decision and Control, Vol. 24, pp. 755-760 Dec. 11-13, 1985, doi: 10.1109/cdc.1985.268599). The temperature schedule defines how the SA converges to the final solution, and has a major influence on whether the SA algorithm will succeed and on whether how long it will take to find the global optimum.

SA has the advantage to leave a local minimum but the disadvantage that it is possible to get back to solutions already visited. Therefore, oscillations around local minima are possible and this may lead to a situation where much computational time is spent on a small part of the solution set. A simple way to avoid such a problem is to store all visited solutions in an ordered list and only accept solutions which are not contained in the list. However, storing all visited solutions and testing if a candidate solution belongs to the list is generally too consuming, both in terms of memory and computational time (in this connection, reference can be made, for example, to P. Brucker, *Scheduling Algorithms*, 1995, doi:10.1007/978-3-662-03088-2).

In the present SA application, the best plan solution coming from GA-based processing represents the starting schedule to be upgraded with the set of not yet planned tasks in the search space of the PW. Similarly to GA-based processing, a solution corresponds to a sequence of 0s (i.e., "zeros") and is (i.e., "ones") according to the feasible and unfeasible DTAs for the tasks set.

In the SSP context, the thought is to improve a solution increasing its Solution Fitness through an optimal check and resolution of the conflicts between the previously planned and the rejected DTAs at each iteration.

In the following TABLE 3 SA concepts applied to SSP are reported:

TABLE 3

| Simulated Annealing application to SSP | | |
|---|---|---|
| Annealing term | Annealing representation | SSP Application |
| Energy | Double | Solution Fitness |
| Cooling Temperature | Double | Evolution Time and Acceptance threshold |

Figure 11:
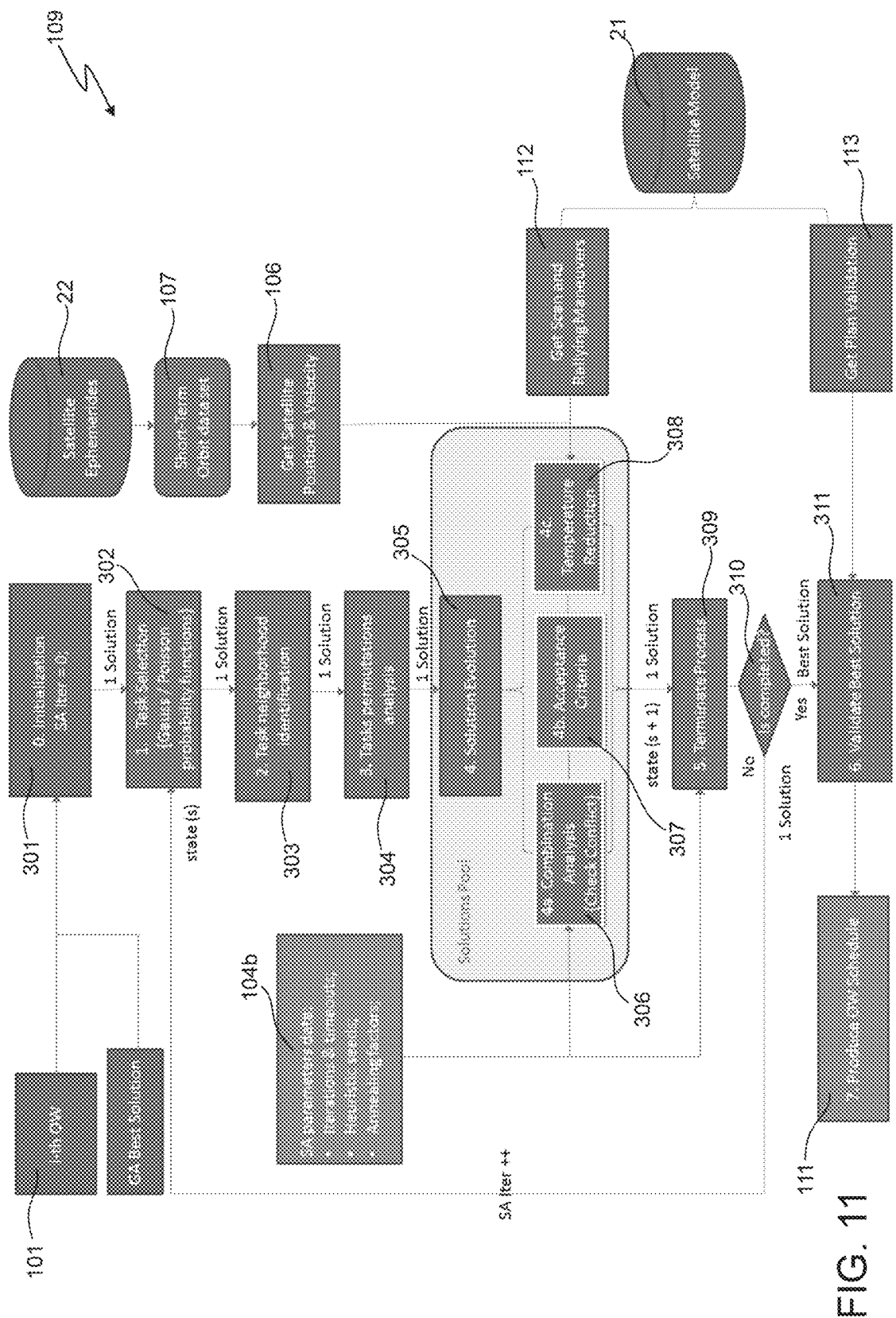
FIG. 11 schematically illustrates a SA-based processing step of the satellite scheduling method of FIG. 3 according to a preferred embodiment of the present disclosure.

FIG. 11 schematically illustrates, by means of a flowchart, the SA-based processing step 109 of the satellite scheduling method 1 according to a preferred embodiment of the present disclosure.

In particular, based on the GA output solution provided by the GA-based processing step 108 (shown in FIG. 10 and described in detail in paragraph 4) for a PW, once SA parameters are set (block 104b in FIG. 11), the SA-based processing step 109 allows to compute a single solution through the following sub-steps:

for a given PW, initializing SA (block 301 in FIG. 11) with the best valid solution provided by the GA-based processing step 108;

selecting a new task to be planned according to specific predefined Gaussian and Poisson probability functions (block 302 in FIG. 11);

identifying the scan Task Nghd according to the influence of the relevant DTO within the Intersection Matrix (block 303 in FIG. 11);

computing permutations of the conflicting tasks ordered according to the chronology of their Task Nghd which promises higher probability of success to the first trials (block 304 in FIG. 11);

finding and proving the best combination of the permuted DTAs (block 306 in FIG. 11) in agreement with the SA acceptance criteria (block 307 in FIG. 11), and on the basis of the SM 21, where the Scan and Rallying Maneuvers interfaces are used (blocks 112a and 112b in FIG. 3, corresponding to block 122 in FIG. 11); the solution evolves (block 305 in FIG. 11) on the basis of the heuristic seeds, the annealing factors (block 104b in FIG. 11) and SA temperature reduction (block 308 in FIG. 11);

terminating SA (block 309 in FIG. 11) according to the stopping criteria (i.e., maximum number of iterations and process timeouts in block 104b in FIG. 11—in this connection reference can be made to the paragraph 6 hereinafter).

According to that:
- if the process is not completed (block 310 in FIG. 11) and the resulting Best Solution is valid (block 311 in FIG. 11) through the Plan Validation interface (blocks 113 in FIGS. 3 and 11) of the Satellite Model (SM) 21, the solution represents the starting input for the next iteration from the task selection sub-step 302;
- if the process is completed and the Best Solution is valid, an optimal PW Schedule is produced (blocks 111 in FIGS. 3 and 11).

6. Scheduling Settings

While the total time interval available for processing the scheduling of an entire Mission Horizon (MH) is considered as a design parameter dependent on the mission Ground Segment chronology, internal settings are conveniently tuned according to the relative properties of the PWs and to the algorithmic features.

The main role is played by the Plan Complexity which allows to make an estimation about the size of the research space to be analyzed according to the involved number of tasks to be scanned in a PW. As stated, higher complexity statistically means a greater number of combinations to be solved and thus an expensive check conflict resolution. Thence, longer slots of time are conveniently allocated for most complex PWs.

Figure 12:
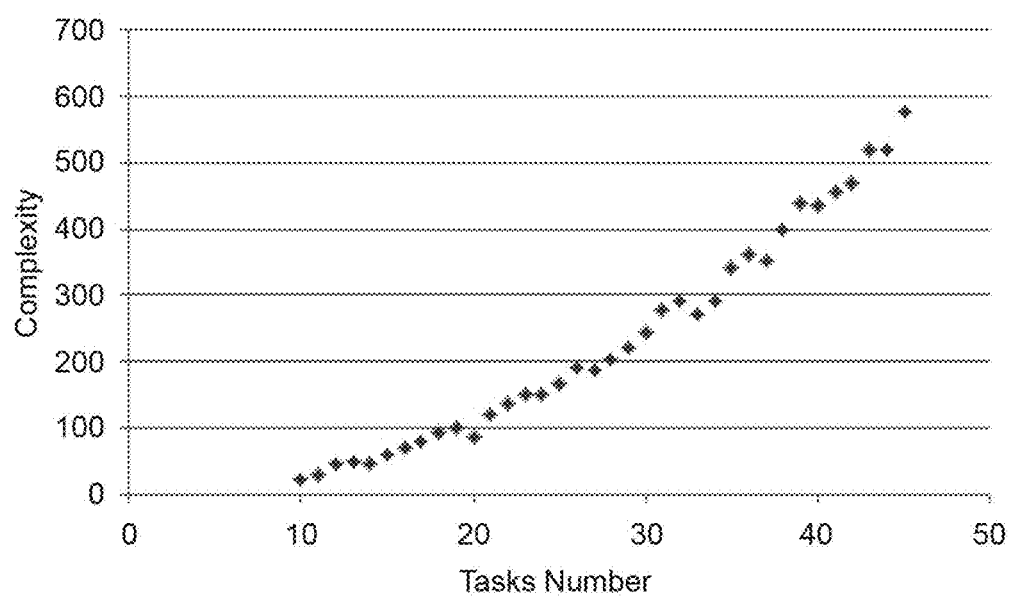
FIG. 12 shows trend of Plan Complexity as a function of the number of tasks.

The trend of the Plan Complexity as a function of the number of tasks follows a statistical quadratic tendency, as shown, from simulations, in FIG. 12. According to this, once identified

- $T_S$ as the available period for a Scheduling Session of a MH with a number of (p=1, ..., P) PWs,
- $N_p$ as the set of the tasks associated with the p-th PW, and
- $C_p$ as the Plan Complexity of the p-th PW, computed according to the equation (10), an a priori evaluation of the relative scheduling period for each of the PW is assumed:

$$T_p = T_S \frac{N_p C_p}{\sum_{p=1}^{P} N_p C_p}, \quad (12)$$

where there results that $$\sum_{p=1}^{P} T_p = T_S.$$

With reference to the global scheduling procedure (i.e., the satellite scheduling method 1), the timeouts of the three base processes, namely
1. the processing steps 102, 103 and 105 (i.e., Extensive Initialization, Plan Complexity and Intersection Matrix computation and analysis, and initial conflict-free solutions computation),
2. the GA-based processing step 108, and
3. the SA-based processing step 109, are conveniently tailored based on the features of the Planning Window (PW) to be scheduled.

In particular,
1. an adequate time shall be left for the scheduling initialization (processing steps 102, 103 and 105) in order to compute, as discussed in paragraph 3, a sufficient number of conflict-free solutions with a maximum rate of diversity; the trend of the computational effort with respect to the initial solutions population is approximately proportional; thence, an available initialization time of:

$$t_{Ip} = kT_p + 2\sigma, \quad (13)$$

where k is the factor and σ is the standard deviation tailored from statistical simulations, that allows to gain the average solutions number (according to FIG. 8) to satisfy the Extensive Initialization for at least 95% of times; once fixed the average mission performance of the Satellite Model for an average initialization, its time interval should not nominally exceed $T_P/3$;

2. the GA parameters are set according to the GA features as shown in the following TABLE 4, where tGA and IterGA identify the stopping criteria; once one of the parameters is exceeded, the GA-based processing 108 terminates (block 209 in FIG. 10); The GA stopping criteria are set according to the GA features. By simulations it shall nominally result: TP/5<tGA<TP/3 and 50<IterGA<100;

TABLE 4

Genetic Algorithm settings

| GA Parameter | Definition | Range Value |
|---|---|---|
| $t_{GA}$ | Algorithm timeout | Between ⅕ and ⅓ of $T_p$ |
| $Iter_{GA}$ | Maximum number of iterations | Between 50 and 100 |

3. the SA parameters are set according to the available scheduling time and the HW performance, as shown in the following TABLE 5; in particular, $t_{SA}$ and $Iter_{SA}$ identify the stopping criteria; once one of the parameters is exceeded, the SA-based processing step 109 terminates (block 310 in FIG. 11); by simulations there nominally results $t_{SA} >= T_P/3$ and $Iter_{SA} = 100$, at least; additional parameters are:
- $T_0$, which identifies the initial state temperature;
- $Np_{Max}$ as the maximum number of tasks to be contemporaneously permuted, and
- $sf_{Acc}$ as the factor necessary to compute the acceptance threshold of the solutions.

TABLE 5

Simulated Annealing settings

| SA Parameter | Definition | Range Value |
|---|---|---|
| $t_{SA}$ | Algorithm timeout | At least ⅓ of $T_p$ |
| $Iter_{SA}$ | Maximum number of iterations | At least 100 |
| $T_0$ | Initial cooling Temperature | As a function of $t_{SA}$ |
| $Np_{Max}$ | Maximum number of tasks that can be permuted at each iteration | Between 9 and 10, according to the calculation performance of the HW machine and the $t_{SA}$ |
| $sf_{Acc}$ | The factor of the acceptance function of the solution | >1 |

7. Genetic Factors

The genetic factors are basically tuned according to the maximum values in their ranges of probability reported in TABLE 2, due to the reduced available time for the GA processing.

In particular, a maximum rate of crossover ($gf_c = 0.95$) is suggested in order to increase the number of combinations of the designated solutions by Tournament Selection, for which an equal rate of single-point and multiple-point crossover ($gf_{cm} = 0.5$) is expected.

However, while elitism may be left as a constant value ($gf_e$=0.2) considering a fixed solutions population (almost 2 children from 2 parents) across the iterations, an adaptive mutation allows an increase in the probability of expansion of the research space exploration in case no improvements occur for consecutive iterations. In this way, considering an initial mutation ($g_{m0}$=0.1), a surplus ($g_{m+}$=0.1) is added if there is no benefit in terms of fitness result on the best solution of the next generation, while a defect ($g_{m-}$=−0.1) is imposed in case benefit occurs. The constraint $0 \leq g_m \leq 1$ shall be not overpassed where, for the boundary case of $g_m$=1, every solution is subjected to mutation.

8. Temperature Decrease

The cooling rate ($\beta$) of the temperature which guides the SA evolution is conveniently set according to the tolerance that would be imposed to solutions which are worsen than the best ones. A high cooling rate minimizes the approval of these solutions; on the other hand, a slow cooling increases the possibilities of a worsen choice, expanding the SA research in the solutions domain.

The values of $T_0$ and $\beta$ are conveniently set according to the timeout imposed to the SA, and to the condition that the temperature T tends to zero at its final status from the equation (14) defined hereinafter.

Through simulations, a mean cooling imposed by the conditions $T_0$=1 and $3 \leq \beta \leq 5$ represents a good trade-off to be pursued. According to these assumptions, there easily results at time (t):

$$T(t_i) = e^{-\beta\left(\frac{t_i - t_0}{t_{SA} - t_0}\right)} \quad (14)$$

where $t_0$ and $t_{SA}$ represent the start and stop times of the SA-based processing step 109, between the sub-steps 301 and 311 respectively.

9. Energy Assignment

The SA Energy (E) is conveniently set according to the solution fitness at a given step. This condition is balanced by the necessity of reaching a suitable energetic difference between solutions, in order to guarantee a reasonable acceptance probability for the worsen solutions.

The Energy E is then associated to the Solution Fitness defined in equation (8), thereby resulting:

$$E = F_G = \sum_{i=1}^{N_{Obj}} w_i f_i \left( \sum_{i=1}^{N_{TSched}} T_j \right). \quad (15)$$

To guarantee a satisfactory acceptance threshold, the configuration of the weights for the relevant objectives is conveniently set according to the mission scopes.

10. Acceptance Function

The tuning between T and E influences the convergence of the solution during the SA evolution in relation with the acceptance probability function, given by equation:

$$P_{Acc}(\Delta E, T) = \begin{cases} f_B = e^{-sf_{Acc}\frac{\Delta E}{T_i}} & \Delta E > 0 \\ 1 & \Delta E \leq 0 \end{cases}, \quad (16)$$

where $sf_{Acc}$ is the solution acceptance factor (see TABLE 5 for reference) and $\Delta E = E(s|1) - E(s)$ is the energetic difference between nearby states of the solution.

Figure 13:
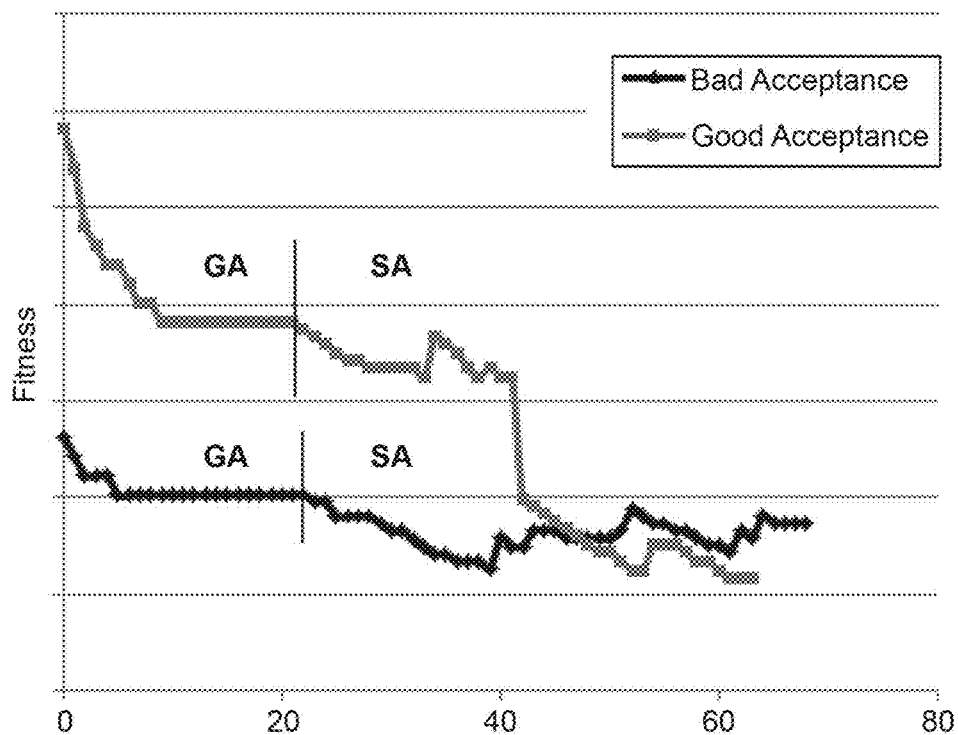
FIG. 13 shows fitness evolution according to solution acceptance probability.

As shown in FIG. 13 (which shows the Solution Fitness evolution according to GASA acceptance probability), even if starting from a lower fitness value, a too high acceptance function (bad acceptance line) can lead to small or zero improvements in convergence to the best GASA solution. This is due to the fact that a high divergence from local optima does not allow the fixing of sub-optimal neighborhoods within the solutions evolved during the iterations. On the other side, an appropriate acceptance (good acceptance line) may allow limited but substantial benefits, leading the GASA solution to a final schedule through satisfactory escapes from the local optima, by potentially also accepting solutions for which it results $\Delta E < 0$. This condition could be not achieved in case no acceptance threshold is foreseen.

11. Probability Distributions

Distribution widths relevant to the known Gaussian and Poisson probability functions, respectively, are chosen according to the prominence to be given to the priority of the scheduled tasks, respectively as:

$$F_{Poisson}(p) = e^{-xp} \quad (17)$$

$$F_{Gauss}(p) = e^{-x(p)^2} \quad (18)$$

where p denotes the relative Priority Rank between N tasks, defined as an integer going from 1 to N, where lower Rank means superior priority.

In order to highlight the selection of priority tasks during the SA evolution, the variance factor relevant to both the distribution widths depends on the relative worth of the tasks Priority weight ($w_1$). Thence, there results:

$$x = K_i \frac{1 - w_1}{\sum_{n=1}^{N_{Obj}} w_n}, \quad (19)$$

where $0 \leq K_i \leq 1$ is an additional tuning factor that may vary during the annealing iterations according to the evolution trend. By default, it can be constantly assumed K=1 as a first-guess value.

12. Test Application of the Disclosure

The present disclosure (GASA) has been applied by the Applicant to a challenging test scenario following the fine tuning discussed in the preceding paragraphs. Comparisons of the performance of GASA with respect to a deterministic strategy, appropriately guided in order to limit the exploration of non-optimal paths, are detailed in the following.

Under identical conditions and Satellite Model (SM) exploitation, according to the selected test scenario, a number of 50 iterations has been performed for the execution of the present heuristic strategy at each problem step, where a maximum of $T_C$=100 s has been established as the threshold of the algorithmic convergence.

A deterministic Breadth-Depth Search (BDS) algorithm of comparison has been executed once for each problem. It progressively tried to schedule one AR at each step until a maximum timeout is reached, while a significant computational effort has been necessary to solve the conflicts with the increase of the number of involved tasks. In order to limit the analysis of the research domain, each optimal scan in terms of Task Fitness function has been stored and repeated for the next iterations; moreover, all the unfeasible branches have been a priori discarded through an analysis of the previous solutions.

Despite of the assumptions made, while for few tasks the BDS-like algorithm takes a short time (about 50 s for 10 tasks), for the optimization of 50 tasks about 30 hours (108000 s) have been necessary.

12.1 Performance

GASA performance in the resolution of the check conflicts among multiple requests have been tested with a real optical satellite mission. The optimization performance concerning a strategy based on pure Simulated Annealing (SA) has been originally considered as a term of appraisal of the improvements due to application of the Genetic Algorithms, while the BDS-like algorithm results have been taken as a common term of comparison.

Figure 14:
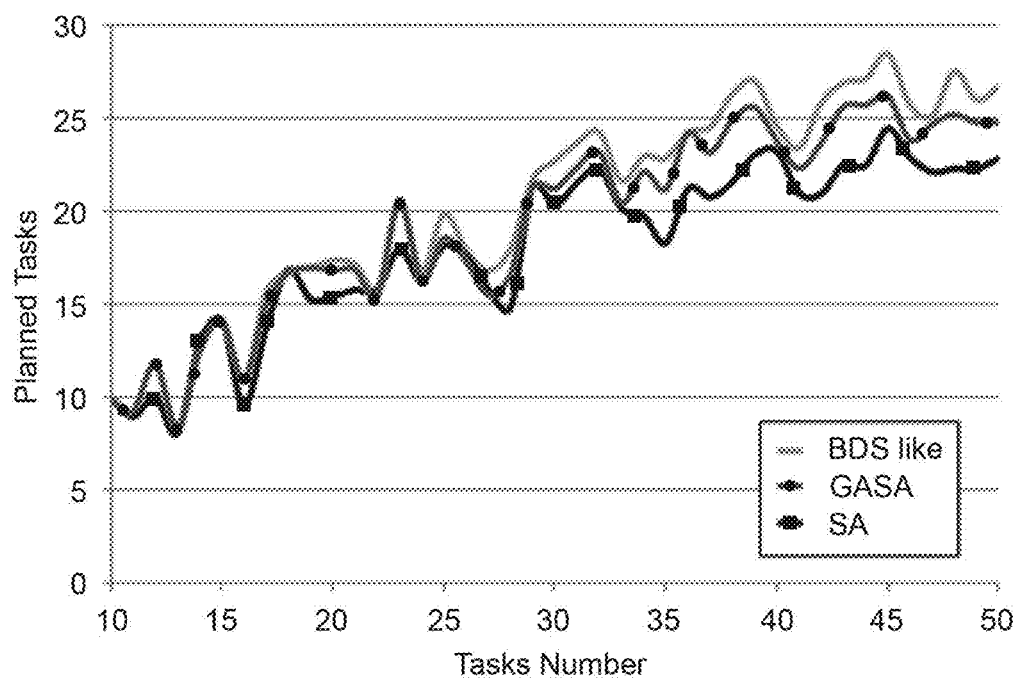
FIG. 14 shows a comparison among applications of a deterministic Breadth-Depth Search (BDS) algorithm, a pure Simulated Annealing, and the present disclosure to a real test scenario.

As shown in FIG. 14 (which shows a comparison, in terms of number of planned tasks, among applications of the BDS-like algorithm, a pure SA and GASA), an average of 1.5 tasks is additionally planned by means of the GASA technique with respect to the pure SA. In particular, from FIG. 14 it emerges that GASA better maintains the performance when problem complexity increases (higher number of tasks).

Figure 15:
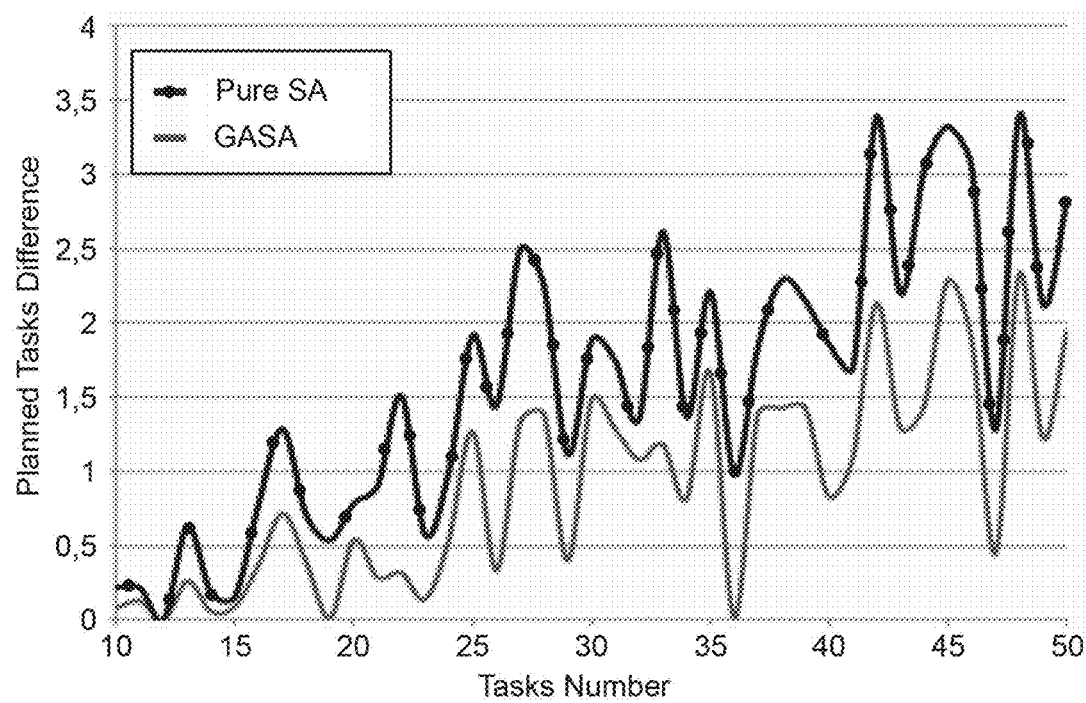
FIG. 15 shows a further comparison between applications of a pure Simulated Annealing and the present disclosure to said real test scenario.

Moreover, from FIG. 15 (which shows a comparison, in terms of difference in planned tasks, between applications of the pure SA and GASA) a percentage of about 58% of solutions coming from GASA averagely maintains the error under 1 planned task, against the lesser 35% resulting for the pure SA.

12.2 GASA Features

Figure 16:
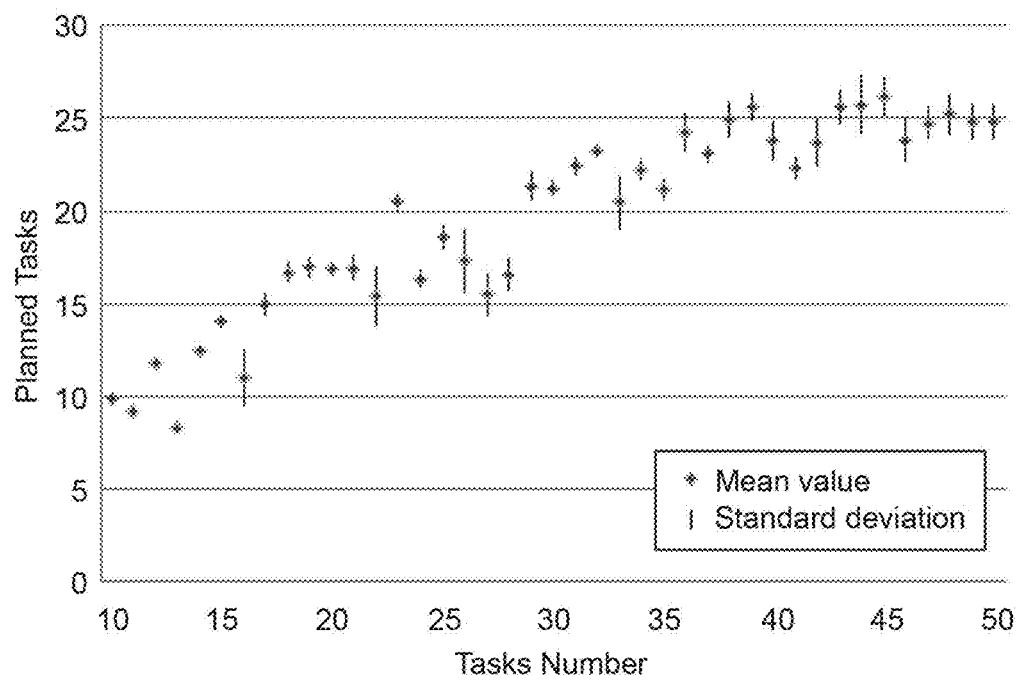
FIG. 16 shows a comparison between standard deviation and mean value of the number of tasks planned by means of the present disclosure in said real test scenario.

According to the Plan Complexity trend shown in FIG. 12, GASA strategy has been analyzed with respect to a set of specific features comprehending robustness, accuracy of the convergence and computational effort.

a. A guaranty of robustness of an algorithm is given by the ability of converging to a satisfactory solution also when a bad set of inputs is assumed. This feature in GASA is reached through the application of practices which allow an expansion of the research to portions of the solution domain which have not been initially taken into account. The adaptive mutation applied during the genetic evolution and the acceptance probability imposed in the annealing process are techniques which allow the extension of the research to new solutions paths and increase the possibilities to converge to optimal results. However, a higher and higher robustness can be reached by an appropriate tuning of the techniques according to the specific mission scopes.

b. The convergence accuracy has been analyzed based on the standard deviation associated to the number of planned tasks for the set of iterations. From FIG. 16 (which shows a comparison between the standard deviation and the mean value of the number of tasks planned by means of the GASA technique) it is shown that the standard deviation ($\sigma$) does not increase with the Plan Complexity and, in most cases, it is limited to a fraction of a task, with a mean value $\sigma_M$=0.75. That outcome reveals a suitable repeatability of the results for equivalent scenarios and a good accuracy of the proposed algorithm.

c. The computational effort has been estimated by imposing a convergence time $T_C$=100 s for the algorithmic processing only. Assuming this forced time and according to an interval surplus given by the SM performance in Validation, an average whole convergence time $T_{WC}$=140 s has been estimated.

The performance requirement relevant to the optical satellite mission selected for testing the present disclosure requires to perform the SSP of a minimum number of tasks $N_{TMH}$=100 within a certain Scheduling Session $T_{SS}$=600 s.

According to the results obtained, an average number of about 25 tasks is planned by means of the GASA strategy for a relevant number of input tasks (50 tasks at the beginning) within a PW of 900 s. This means that, for an average of 4 Planning Windows (PWs) of 900 s each (3600 s at all), a number of 100 tasks should be practically planned. Computational performance is also in line with the requirement; indeed, a maximum time of 4×140 s=560 s<600 s is requested for the global scheduling.

Figure 17:
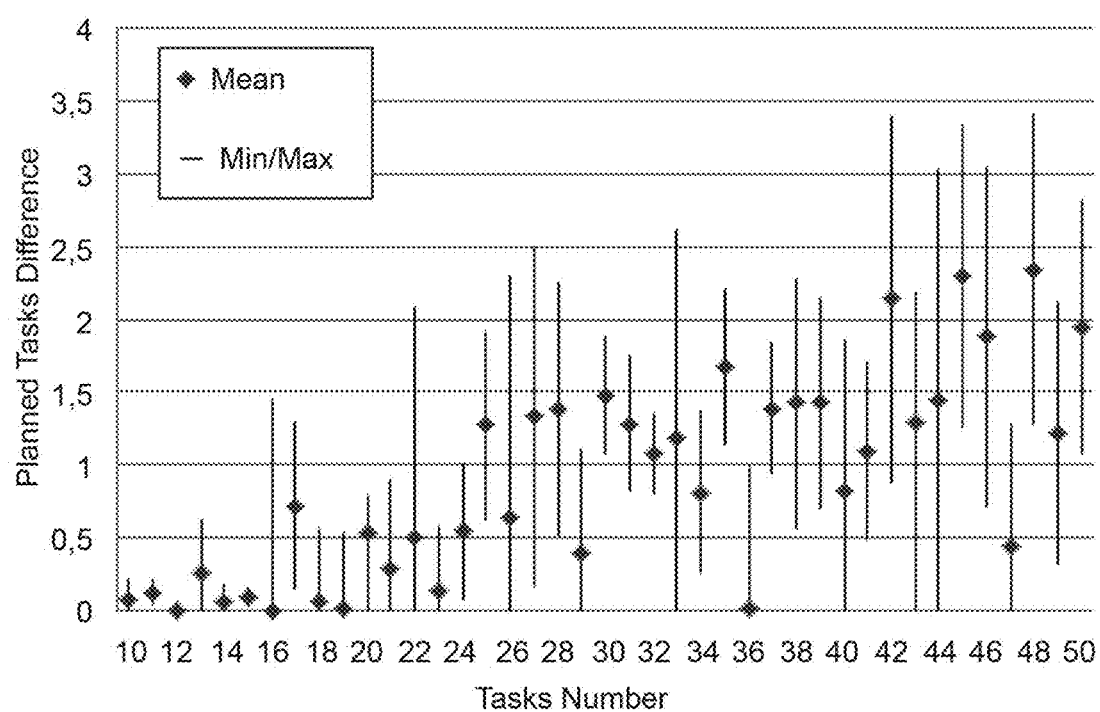
FIG. 17 shows mean number and minimum/maximum difference of the number of tasks planned by means of the present disclosure in said real test scenario.

Moreover, as shown in FIG. 17 (which shows mean number and minimum/maximum difference of the number of tasks planned by means of the GASA technique), GASA strategy was able to retrieve at least one optimal solution for the 40% of cases, also for some cases of significant complexity. This means that a parallelization of the strategy would theoretically permit to efficiently increment the probabilities to reach optimal solutions for a consistent amount of cases with the same computational time effort.

12.3 GASA Benefits

The fine performance shown along with the rapidity in convergence (100 s by default for the scenarios of interest) make the GASA technique a good method to reach satisfactory solutions for SSPs relevant to the mission under investigation. Indeed, the growth of the Plan Complexity did not cause lacks in the computed solutions, since, as described, GASA has been able to get close to, and reach, optimal solutions. These circumstances have occurred in an average time interval even 700 times smaller than the one necessary for the convergence of the BDS strategy (140 s vs 108000 s) in a test scenario of 50 tasks.

The benefits hypothesized from the combination of the different heuristic algorithms during the investigation of the global strategy for the multi-objective optimization are demonstrated to be actual when applied to the optical satellite mission selected for testing the present disclosure. Indeed, the GASA technique is able to satisfy the scheduling requirement required for this specific mission.

13. Advantages of the Disclosure

From the foregoing description the technical advantages of the present disclosure are immediately clear.

In this connection, it is important to point out that the present disclosure allows the fulfillment of all the steps of the "mission chain" in the Ground Segment of an EO satellite in a multi-mission environment. The present disclosure allows to maximize the possibilities of acquisition of the requests according to specific mission constraints, by minimizing, or rather best solving, mutual conflicts among acquisition tasks within a predefined Scheduling Session.

In particular, the present disclosure exploits an innovative hybrid strategy for the optimization of the Satellite Scheduling Problem (SSP), which innovative hybrid strategy (named GASA) is based on Genetic Algorithms (GAs) for finding "first" optimal solutions and Simulated Annealing (SA) for local search within the neighborhoods of the solutions retrieved by the GAs (in order to try planning initially rejected tasks according to a sort of "best effort" approach) and, in this way, allows to extend the research to new solutions and increases the possibilities to converge to optimal results.

Moreover, the GASA combined heuristic strategy, as previously demonstrated by the results of the application of the disclosure to a real optical satellite, provides:

high robustness by converging to a satisfactory solution also with bad sets of inputs thanks to the adaptive mutation during the genetic evolution and the proper design of the acceptance function in the annealing process;

a fine repeatability of the results for equivalent scenarios and, hence, a good accuracy and quality of the results; and also predictable time performances.

Additionally, it is worth also noting that the Mission Planner (MP) according to the present disclosure is applicable to a generic EO satellite, since it exploits reusable software elements and, in order to adapt and interact with different missions, requires only the configuration of the parameters and the integration of an external Satellite Model (SM), thereby allowing also to reduce the number of development and test activities.

In particular, the multi-mission architecture of the MP according to the present disclosure provides several advantages, particularly:

the reduction of the effort in developing, testing and integrating the necessary components within the Ground Segment architecture of EO systems; and the application of fully reusable software modules, Graphical User Interfaces (GUIs) and algorithms to extended space programs.

Moreover, the mission-dependent Satellite Model (SM) integrated into the Mission Planner (MP) guarantees the rigorous compliance of the maneuvers with the satellite mission rules.

Finally, it is important to stress the point that the present disclosure, albeit previously described with reference to an optical satellite (i.e., a remote sensing satellite equipped with an optical sensor), can be advantageously applied to the scheduling of:

a single remote sensing satellite provided with a sensor of a different kind (such as a SAR or an infrared sensor), or even fitted with multiple sensors of different kinds (such as a SAR plus an optical sensor); and also a constellation of satellites equipped with sensors of one and the same type, or of different types.

Moreover, the present disclosure may be advantageously used for the optimization of the scheduling, not only of the Planning Windows (PWs) for image acquisition, but also:

of Uplink and Downlink Windows (UWs, DWs); and more in general, even of generic satellite assets (such as memory resources, power resources, etc.) of single EO satellites (in single and multi-spectral bands) or EO satellite constellations.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A satellite scheduling method including:

providing a processing system that is configured to operate as satellite mission planner and is programmed to implement a plan initialization module, a genetic algorithm processing module, and a simulated annealing processing module;

computing, using the plan initialization module:

an intersection matrix based on input requests related to tasks to be performed within a given time period by one or more remote sensing satellites, wherein said intersection matrix represents conflicts, in time and in using satellite resources of the one or more remote sensing satellites, of the tasks to be performed within the given time period by the one or more remote sensing satellites;

a plan complexity based on the intersection matrix; and given genetic-algorithm-related stopping criteria based on the intersection matrix;

producing, using the plan initialization module, initial scheduling plans based on the intersection matrix, wherein in each of said initial scheduling plans respective tasks are scheduled, which do not conflict with each other in time and in using the satellite resources of the one or more remote sensing satellites; and wherein each of the tasks to be performed is scheduled in at least one of the initial scheduling plans;

applying, using the genetic algorithm processing module, a genetic-algorithm-based processing to the initial scheduling plans to produce a genetic-algorithm-based scheduling plan that is optimized with respect to given mission objectives, and that complies with given constraints related to the satellite resources, to the tasks to be performed, and to the given time period;

wherein applying, using the genetic algorithm processing module, the genetic-algorithm-based processing to the initial scheduling plans includes carrying out, using the genetic algorithm processing module, a genetic-algorithm-based iterative procedure comprising:

at a first genetic-algorithm-based iteration, selecting a subset of the initial scheduling plans on the basis of the given mission objectives, and applying crossover, mutation and elitism techniques based on respective predefined genetic evolution factors to the selected subset of the initial scheduling plans to produce evolved scheduling plans complying with the given constraints;

at each genetic-algorithm-based iteration following the first one, selecting, on the basis of the given mission objectives, a subset of the evolved scheduling plans produced at a preceding genetic-algorithm-based iteration, and applying the crossover, mutation and elitism techniques to the selected subset of the evolved scheduling plans produced at the preceding genetic-algorithm-based iteration to produce new evolved scheduling plans complying with the given constraints;

wherein applying, using the genetic algorithm processing module, the genetic-algorithm-based processing to the initial scheduling plans further includes:

stopping carrying out the genetic-algorithm-based iterative procedure when the given genetic-algorithm-related stopping criteria are met; and automatically selecting, by the genetic algorithm processing module, among the evolved scheduling plans produced at the last genetic-algorithm-based iteration performed, the one which best fits the given mission objectives, thereby producing the genetic-algorithm-based scheduling plan;

the satellite scheduling method further including:

applying, using the simulated annealing processing module, a simulated-annealing-based processing to the genetic-algorithm-based scheduling plan to produce a simulated-annealing-based scheduling plan that fits the given mission objectives, that complies with the given constraints, and in which a larger number of tasks is scheduled than in the genetic-algorithm-based scheduling plan; and causing, by the processing system, the one or more remote sensing satellites to perform scheduled tasks according to the simulated-annealing-based scheduling plan.

2. The satellite scheduling method of claim 1, further including computing, using the plan initialization module, given simulated-annealing-related stopping criteria based on the intersection matrix, wherein applying, using the simulated annealing processing module, the simulated-annealing-based processing to the genetic-algorithm-based scheduling plan includes carrying out, using the simulated annealing processing module, a simulated-annealing-based iterative procedure comprising:

at a first simulated-annealing-based iteration,
selecting, according to one or more predefined probability functions, a task not scheduled in the genetic-algorithm-based scheduling plan,
identifying a neighborhood of the selected task, wherein the identified neighborhood includes a set of conflicting tasks not scheduled in the genetic-algorithm-based scheduling plan,
performing permutations of the conflicting tasks in the identified neighborhood,
applying a simulated annealing technique to outcomes of the performed permutations to find tasks that:
are not scheduled in the genetic-algorithm-based scheduling plan,
are schedulable along with the tasks already scheduled in said genetic-algorithm-based scheduling plan,
fit the given mission objectives, and
comply with the given constraints, and
producing a scheduling plan including the found tasks;
at each simulated-annealing-based iteration following the first simulated-annealing-based iteration,
selecting, according to the one or more predefined probability functions, a further task not scheduled in the scheduling plan produced at a preceding simulated-annealing-based iteration,
identifying a neighborhood of the further task selected, wherein the identified neighborhood includes a set of conflicting tasks not scheduled in the scheduling plan produced at the preceding simulated-annealing-based iteration,
performing permutations of the conflicting tasks in the identified neighborhood,
applying the simulated annealing technique to outcomes of the performed permutations to find tasks that:
are not scheduled in the scheduling plan produced at the preceding simulated-annealing-based iteration,
are schedulable along with the tasks already scheduled in said scheduling plan produced at the preceding simulated-annealing-based iteration,
fit the given mission objectives, and
comply with the given constraints, and
producing a new scheduling plan including the found tasks;
wherein applying, using the simulated annealing processing module, the simulated-annealing-based processing to the genetic-algorithm-based scheduling plan further includes stopping carrying out the simulated-annealing-based iterative procedure when given simulated-annealing-related stopping criteria are met;

and wherein the simulated-annealing-based scheduling plan is the scheduling plan produced at the last simulated-annealing-based iteration performed.

3. The satellite scheduling method according to claim 1, wherein the given mission objectives are mathematically represented by a global cost function computed based on several local cost functions based on the given constraints.

4. A processing system designed to operate as satellite mission planner for one or more Earth Observation systems including one or more remote sensing satellites, wherein said processing system is programmed to implement a plan initialization module, a genetic algorithm processing module and a simulated annealing processing module;

wherein the plan initialization module is configured to:
compute an intersection matrix based on input requests related to tasks to be performed within a given time period by one or more remote sensing satellites, wherein said intersection matrix represents conflicts, in time and in using satellite resources of the one or more remote sensing satellites, of the tasks to be performed within the given time period by the one or more remote sensing satellites;
compute a plan complexity based on the intersection matrix; and
compute given genetic-algorithm-related stopping criteria based on the intersection matrix;
produce initial scheduling plans based on the intersection matrix, wherein in each of said initial scheduling plans respective tasks are scheduled, which do not conflict with each other in time and in using the satellite resources of the one or more remote sensing satellites; and wherein each of the tasks to be performed is scheduled in at least one of the initial scheduling plans;

wherein the genetic algorithm processing module is configured to apply a genetic-algorithm-based processing to the initial scheduling plans to produce a genetic-algorithm-based scheduling plan that is optimized with respect to given mission objectives, and that complies with given constraints related to the satellite resources, to the tasks to be performed, and to the given time period;

wherein the genetic algorithm processing module is configured to apply the genetic-algorithm-based processing to the initial scheduling plans includes carrying out, using the genetic algorithm processing module, a genetic-algorithm-based iterative procedure comprising:

at a first genetic-algorithm-based iteration,
selecting a subset of the initial scheduling plans on the basis of the given mission objectives, and
applying crossover, mutation and elitism techniques based on respective predefined genetic evolution factors to the selected subset of the initial scheduling plans to produce evolved scheduling plans complying with the given constraints;
at each genetic-algorithm-based iteration following the first one,
selecting, on the basis of the given mission objectives, a subset of the evolved scheduling plans produced at a preceding genetic-algorithm-based iteration, and
applying the crossover, mutation and elitism techniques to the selected subset of the evolved scheduling plans produced at the preceding genetic-algorithm-based iteration to produce new evolved scheduling plans complying with the given constraints;

wherein the genetic algorithm processing module is further configured to:
stop carrying out the genetic-algorithm-based iterative procedure when the given genetic-algorithm-related stopping criteria are met; and
automatically select, by the genetic algorithm processing module, among the evolved scheduling plans produced at the last genetic-algorithm-based iteration performed, the one which best fits the given mission objectives, thereby producing the genetic-algorithm-based scheduling plan;
wherein the simulated annealing processing module is configured to apply a simulated-annealing-based processing to the genetic-algorithm-based scheduling plan to produce a simulated-annealing-based scheduling plan that fits the given mission objectives, that complies with the given constraints, and in which a larger number of tasks is scheduled than in the genetic-algorithm-based scheduling plan; and
wherein said processing system is configured to cause the one or more remote sensing satellites to perform scheduled tasks according to the simulated-annealing-based scheduling plan.

5. A non-transitory computer-readable medium comprising one or more software code portions that are executable by a processing system and such that to cause, when executed, said processing system to carry out a satellite scheduling method that includes:
providing a processing system that is configured to operate as satellite mission planner and is programmed to implement a plan initialization module, a genetic algorithm processing module, and a simulated annealing processing module;
computing, using the plan initialization module:
an intersection matrix based on input requests related to tasks to be performed within a given time period by one or more remote sensing satellites, wherein said intersection matrix represents conflicts, in time and in using satellite resources of the one or more remote sensing satellites, of the tasks to be performed within the given time period by the one or more remote sensing satellites;
a plan complexity based on the intersection matrix; and
given genetic-algorithm-related stopping criteria based on the intersection matrix;
producing, using the plan initialization module, initial scheduling plans based on the intersection matrix, wherein in each of said initial scheduling plans respective tasks are scheduled, which do not conflict with each other in time and in using the satellite resources of the one or more remote sensing satellites; and wherein each of the tasks to be performed is scheduled in at least one of the initial scheduling plans;
applying, using the genetic algorithm processing module, a genetic-algorithm-based processing to the initial scheduling plans to produce a genetic-algorithm-based scheduling plan that is optimized with respect to given mission objectives, and that complies with given constraints related to the satellite resources, to the tasks to be performed, and to the given time period;
wherein applying, using the genetic algorithm processing module, the genetic-algorithm-based processing to the initial scheduling plans includes carrying out, using the genetic algorithm processing module, a genetic-algorithm-based iterative procedure comprising:
at a first genetic-algorithm-based iteration,
selecting a subset of the initial scheduling plans on the basis of the given mission objectives, and
applying crossover, mutation and elitism techniques based on respective predefined genetic evolution factors to the selected subset of the initial scheduling plans to produce evolved scheduling plans complying with the given constraints;
at each genetic-algorithm-based iteration following the first one,
selecting, on the basis of the given mission objectives, a subset of the evolved scheduling plans produced at a preceding genetic-algorithm-based iteration, and
applying the crossover, mutation and elitism techniques to the selected subset of the evolved scheduling plans produced at the preceding genetic-algorithm-based iteration to produce new evolved scheduling plans complying with the given constraints;
wherein applying, using the genetic algorithm processing module, the genetic-algorithm-based processing to the initial scheduling plans further includes:
stopping carrying out the genetic-algorithm-based iterative procedure when the given genetic-algorithm-related stopping criteria are met; and
automatically selecting, by the genetic algorithm processing module, among the evolved scheduling plans produced at the last genetic-algorithm-based iteration performed, the one which best fits the given mission objectives, thereby producing the genetic-algorithm-based scheduling plan;
applying, using the simulated annealing processing module, a simulated-annealing-based processing to the genetic-algorithm-based scheduling plan to produce a simulated-annealing-based scheduling plan that fits the given mission objectives, that complies with the given constraints, and in which a larger number of tasks is scheduled than in the genetic-algorithm-based scheduling plan; and
causing the one or more remote sensing satellites to perform scheduled tasks according to the simulated-annealing-based scheduling plan.

* * * * *